US012692328B2

(12) United States Patent
Mueller et al.

(10) Patent No.: US 12,692,328 B2
(45) Date of Patent: Jul. 28, 2026

(54) B-STAGEABLE AQUEOUS BINDER COMPOSITIONS

(71) Applicant: Owens Corning Intellectual Capital, LLC, Toledo, OH (US)

(72) Inventors: Gert Mueller, New Albany, OH (US); Andrew Broderick, Newark, OH (US); Xiujuan Zhang, New Albany, OH (US); Liang Chen, New Albany, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 17/491,755

(22) Filed: Oct. 1, 2021

(65) Prior Publication Data

US 2022/0106419 A1     Apr. 7, 2022

Related U.S. Application Data

(60) Provisional application No. 63/086,267, filed on Oct. 1, 2020.

(51) Int. Cl.

| | |
|---|---|
| *C08F 20/06* | (2006.01) |
| *C08J 3/24* | (2006.01) |
| *C08K 3/013* | (2018.01) |
| *C08K 5/053* | (2006.01) |
| *C08L 83/04* | (2006.01) |
| *D06N 3/00* | (2006.01) |
| *E04B 1/88* | (2006.01) |

(52) U.S. Cl.
CPC ................. *C08F 20/06* (2013.01); *C08J 3/24* (2013.01); *C08K 3/013* (2018.01); *C08K 5/053* (2013.01); *C08L 83/04* (2013.01); *D06N 3/0022* (2013.01); *E04B 1/88* (2013.01); *C08J 2333/08* (2013.01); *D06N 2201/082* (2013.01); *D06N 2203/041* (2013.01); *D06N 2203/066* (2013.01); *D06N 2207/08* (2013.01); *D06N 2209/065* (2013.01)

(58) Field of Classification Search
CPC ............................... C08K 5/053; C08L 33/02
See application file for complete search history.

(56) References Cited

U.S. PATENT DOCUMENTS

| | | | |
|---|---|---|---|
| 3,920,868 | A | 11/1975 | Hammer |
| 4,613,627 | A | 9/1986 | Sherman et al. |
| 4,777,763 | A | 10/1988 | Shannon et al. |
| 4,794,728 | A | 1/1989 | Tsukada et al. |
| 5,244,695 | A | 9/1993 | Davidowich et al. |
| 5,300,192 | A | 4/1994 | Hansen et al. |
| 5,318,990 | A | 6/1994 | Strauss |
| 5,342,680 | A | 8/1994 | Randall |
| 5,349,041 | A | 9/1994 | Blum et al. |
| 5,600,919 | A | 2/1997 | Kummermehr et al. |
| 5,644,880 | A | 7/1997 | Lehnert et al. |
| 5,660,900 | A | 8/1997 | Andersen et al. |
| 5,661,213 | A | 8/1997 | Arkens et al. |
| 5,679,145 | A | 10/1997 | Andersen et al. |
| 5,763,524 | A | 6/1998 | Arkens et al. |
| 5,810,961 | A | 9/1998 | Andersen et al. |
| 5,948,833 | A | 9/1999 | Jilek et al. |
| 6,030,673 | A | 2/2000 | Andersen et al. |
| 6,068,907 | A | 5/2000 | Beauregard |
| 6,071,994 | A | 6/2000 | Hummerich et al. |
| 6,079,153 | A | 6/2000 | Templeton |
| 6,099,773 | A | 8/2000 | Reck et al. |
| 6,123,172 | A | 9/2000 | Byrd et al. |
| 6,146,746 | A | 11/2000 | Reck et al. |
| 6,150,002 | A | 11/2000 | Varona |
| 6,221,973 | B1 | 4/2001 | Arkens et al. |
| 6,299,936 | B1 | 10/2001 | Reck et al. |
| 6,305,495 | B1 | 10/2001 | Keegan |
| 6,331,350 | B1 | 12/2001 | Taylor et al. |
| 6,443,256 | B1 | 9/2002 | Baig |
| 6,511,561 | B1 | 1/2003 | Kohlhammer et al. |
| 6,699,945 | B1 | 3/2004 | Chen et al. |
| 6,734,237 | B1 | 5/2004 | Taylor et al. |
| 6,759,116 | B2 | 7/2004 | Edlund |
| 6,774,071 | B2 | 8/2004 | Horner et al. |
| 6,780,356 | B1 | 8/2004 | Putt et al. |

(Continued)

FOREIGN PATENT DOCUMENTS

| | | |
|---|---|---|
| CA | 1228557 A1 | 10/1987 |
| CA | 2301248 A1 | 9/2000 |

(Continued)

OTHER PUBLICATIONS

Wikipedia, "Triose," retrieved from <https://en.wikipedia.org/wiki/Triose> on Oct. 29, 2021.
International Search Report and Written Opinion from PCT/US2021/053093 dated Jul. 6, 2022.
Lee et al., "A Review on Citric Acid as Green Modifying Agent and Binder for Wood," Polymers, 2020; 12(8): 1692, 21 pages.
Extended European Search Report from EP Application No. 21876562.6 dated Oct. 21, 2024.

(Continued)

*Primary Examiner* — Wenwen Cai
(74) *Attorney, Agent, or Firm* — Calfee, Halter & Griswold LLP

(57) ABSTRACT

An aqueous binder composition is disclosed that includes 5.0% by weight to 50.0% by weight of a monomeric polyol having at least four hydroxyl groups, based on the total solids content of the aqueous binder composition; and at least 50.0% by weight of a cross-linking agent comprising a polymeric polycarboxylic acid having at least two carboxylic acid groups, based on the total solids content of the aqueous binder composition. The aqueous binder composition includes a ratio of molar equivalents of carboxylic acid groups to hydroxyl groups is between 0.15/1.0 and 2.23/1 and has a pH of 2.2 to 4.0 and a viscosity at 40% solids and 25° C. of 10 cP to 60 cP.

15 Claims, 5 Drawing Sheets

(56) References Cited

U.S. PATENT DOCUMENTS

| | | |
|---|---|---|
| 6,803,439 B2 | 10/2004 | Taylor |
| 6,818,694 B2 | 11/2004 | Hindi et al. |
| 6,838,163 B2 | 1/2005 | Smith et al. |
| 6,849,683 B2 | 2/2005 | Husemoen et al. |
| 6,884,838 B2 | 4/2005 | Taylor et al. |
| 6,933,349 B2 | 8/2005 | Chen et al. |
| 6,939,818 B2 | 9/2005 | Drax et al. |
| 6,951,602 B1 | 10/2005 | Reuter et al. |
| 7,026,390 B2 | 4/2006 | O'Brien-Bernini et al. |
| 7,067,579 B2 | 6/2006 | Taylor et al. |
| 7,141,284 B2 | 11/2006 | Newton et al. |
| 7,157,524 B2 | 1/2007 | Chen et al. |
| 7,199,179 B2 | 4/2007 | Clamen et al. |
| 7,300,892 B2 | 11/2007 | Porter |
| 7,338,702 B2 | 3/2008 | Swales et al. |
| 7,351,673 B1 | 4/2008 | Groh et al. |
| 7,377,084 B2 | 5/2008 | Swiszcz et al. |
| 7,459,490 B2 | 12/2008 | Husemoen et al. |
| 7,547,375 B2 | 6/2009 | Jaffee et al. |
| 7,641,764 B2 | 1/2010 | Yoshida et al. |
| 7,803,727 B2 | 9/2010 | Aseere et al. |
| 7,807,592 B2 | 10/2010 | Bland et al. |
| 7,824,762 B2 | 11/2010 | Ziegler |
| 7,829,488 B2 | 11/2010 | Bennett |
| 7,833,638 B2 | 11/2010 | Zheng et al. |
| 7,842,382 B2 | 11/2010 | Helbing |
| 7,893,154 B2 | 2/2011 | Van Herwijnen et al. |
| 7,989,370 B2 | 8/2011 | Currier et al. |
| 8,007,886 B2 | 8/2011 | Tierney et al. |
| 8,017,531 B2 | 9/2011 | Ahluwalia et al. |
| 8,044,168 B2 | 10/2011 | Gudik-Sorensen |
| 8,069,629 B2 | 12/2011 | Rockwell et al. |
| 8,084,379 B2 | 12/2011 | Hogan et al. |
| 8,127,509 B2 | 3/2012 | Propst |
| 8,133,952 B2 | 3/2012 | Pisanova et al. |
| 8,209,904 B2 | 7/2012 | Bouwens et al. |
| 8,211,974 B2 | 7/2012 | Shooshtari et al. |
| 8,283,266 B2 | 10/2012 | Jaffee et al. |
| 8,299,153 B2 | 10/2012 | Kelly |
| 8,329,798 B2 | 12/2012 | Clamen et al. |
| 8,329,817 B2 | 12/2012 | Espiard et al. |
| 8,357,746 B2 | 1/2013 | Shooshtari |
| 8,486,516 B2 | 7/2013 | Hauber et al. |
| 8,552,140 B2 | 10/2013 | Swift |
| 8,603,631 B2 | 12/2013 | Helbing |
| 8,604,122 B2 | 12/2013 | Kelly |
| 8,607,929 B2 | 12/2013 | Bliton et al. |
| 8,623,234 B2 | 1/2014 | Jaffrennou et al. |
| 8,650,913 B2 | 2/2014 | Chacko et al. |
| 8,652,579 B2 | 2/2014 | Shooshtari et al. |
| 8,791,198 B2 | 7/2014 | Miller et al. |
| 8,808,443 B2 | 8/2014 | Jaffrennou |
| 8,815,382 B2 | 8/2014 | Robinson, Jr. |
| 8,864,893 B2 | 10/2014 | Hawkins et al. |
| 8,865,816 B2 | 10/2014 | Zhang |
| 8,974,686 B2 | 3/2015 | Jaffrennou et al. |
| 8,980,774 B2 | 3/2015 | Zhang et al. |
| 9,039,827 B2 | 5/2015 | Hampson |
| 9,172,074 B2 | 10/2015 | Weber et al. |
| 9,174,868 B2 | 11/2015 | Jaffrennou et al. |
| 9,217,065 B2 | 12/2015 | Shoemake et al. |
| 9,238,749 B2 | 1/2016 | Michl et al. |
| 9,290,640 B2 | 3/2016 | Hawkins et al. |
| 9,309,436 B2 | 4/2016 | Swift |
| 9,359,720 B2 | 6/2016 | Chuda et al. |
| 9,376,810 B2 | 6/2016 | Kemp et al. |
| 9,382,404 B2 | 7/2016 | Zhang |
| 9,404,012 B2 | 8/2016 | Connaughton, I et al. |
| 9,453,140 B2 | 9/2016 | Varagnat et al. |
| 9,486,980 B2 | 11/2016 | Hauber et al. |
| PP27,475 P2 | 12/2016 | Kubby |
| 9,550,894 B2 | 1/2017 | Zhang et al. |
| 9,609,813 B2 | 4/2017 | Naerum et al. |
| 9,683,143 B2 | 6/2017 | Negri et al. |
| 9,715,872 B2 | 7/2017 | Guzman et al. |
| 9,777,472 B2 | 10/2017 | Wiker et al. |
| 9,815,928 B2 | 11/2017 | Williamson et al. |
| 9,822,042 B2 | 11/2017 | Rosenthal et al. |
| 9,840,061 B2 | 12/2017 | Jaffee |
| 9,869,089 B2 | 1/2018 | Thomas et al. |
| 9,896,807 B2 | 2/2018 | Englert et al. |
| 9,909,310 B2 | 3/2018 | Frank et al. |
| 9,922,634 B2 | 3/2018 | Thompson, Jr. et al. |
| 10,119,211 B2 | 11/2018 | Obert et al. |
| 10,368,502 B2 | 8/2019 | Letton et al. |
| 11,111,372 B2 | 9/2021 | Zhang et al. |
| 11,136,451 B2 | 10/2021 | Zhang et al. |
| 2003/0008978 A1 | 1/2003 | Chen et al. |
| 2003/0060113 A1 | 3/2003 | Christie et al. |
| 2003/0077546 A1 | 4/2003 | Donovan et al. |
| 2004/0038017 A1 | 2/2004 | Tutin et al. |
| 2004/0209074 A1 | 10/2004 | Randall et al. |
| 2004/0219847 A1 | 11/2004 | Miller |
| 2005/0059770 A1 | 3/2005 | Srinivasan et al. |
| 2005/0215153 A1 | 9/2005 | Cossement et al. |
| 2005/0284065 A1 | 12/2005 | Shaffer |
| 2005/0288424 A1 | 12/2005 | Fisler et al. |
| 2006/0036014 A1 | 2/2006 | Hogan et al. |
| 2006/0078719 A1 | 4/2006 | Miele |
| 2006/0079629 A1 | 4/2006 | Taylor et al. |
| 2006/0101796 A1 | 5/2006 | Kem et al. |
| 2006/0137799 A1 | 6/2006 | Haque et al. |
| 2006/0168881 A1 | 8/2006 | Straumietis |
| 2006/0216489 A1 | 9/2006 | Shooshtari et al. |
| 2006/0217471 A1 | 9/2006 | Shooshtari et al. |
| 2006/0252855 A1 | 11/2006 | Pisanova et al. |
| 2007/0010651 A1 | 1/2007 | Finch et al. |
| 2007/0125011 A1 | 6/2007 | Weir et al. |
| 2007/0270066 A1 | 11/2007 | Van Herwijnen et al. |
| 2007/0292619 A1 | 12/2007 | Srinivasan et al. |
| 2008/0047548 A1 | 2/2008 | Konietzny et al. |
| 2008/0138526 A1 | 6/2008 | Tutin et al. |
| 2008/0152816 A1 | 6/2008 | Clamen et al. |
| 2008/0176050 A1 | 7/2008 | Lintz et al. |
| 2009/0036011 A1 | 2/2009 | Hunig et al. |
| 2009/0156724 A1 | 6/2009 | Espiard et al. |
| 2009/0208714 A1 | 8/2009 | Currier et al. |
| 2010/0016143 A1 | 1/2010 | Shooshtari et al. |
| 2010/0040832 A1 | 2/2010 | Herbert |
| 2010/0064618 A1 | 3/2010 | Boyd |
| 2010/0105272 A1 | 4/2010 | Nandi et al. |
| 2010/0154300 A1 | 6/2010 | Wiersma |
| 2010/0273006 A1 | 10/2010 | Rodrigues et al. |
| 2010/0320113 A1 | 12/2010 | Swift |
| 2011/0003522 A1 | 1/2011 | Chen et al. |
| 2011/0159768 A1 | 6/2011 | Crescimanno et al. |
| 2011/0189478 A1 | 8/2011 | Zhang et al. |
| 2012/0064323 A1 | 3/2012 | Shoemake et al. |
| 2012/0076983 A1 | 3/2012 | Yu et al. |
| 2012/0168054 A1 | 7/2012 | Chen et al. |
| 2012/0245277 A1 | 9/2012 | Michl et al. |
| 2012/0311744 A1 | 12/2012 | Sirkowski |
| 2013/0023174 A1 | 1/2013 | Quinn |
| 2013/0026408 A1 | 1/2013 | Jaffrennou et al. |
| 2013/0032749 A1 | 2/2013 | Jaffrennou et al. |
| 2013/0084445 A1 | 4/2013 | Haley et al. |
| 2013/0157030 A1 | 6/2013 | Frick et al. |
| 2013/0244525 A1 | 9/2013 | Chacko et al. |
| 2013/0334726 A1 | 12/2013 | Hernandez-Torres et al. |
| 2014/0038485 A1 | 2/2014 | Anderson et al. |
| 2014/0083328 A1 | 3/2014 | Lochel, Jr. et al. |
| 2014/0120348 A1 | 5/2014 | Didier et al. |
| 2014/0155353 A1 | 6/2014 | Tezuka et al. |
| 2014/0186635 A1 | 7/2014 | Mueller |
| 2014/0245797 A1 | 9/2014 | Haley et al. |
| 2014/0350142 A1 | 11/2014 | Hansen et al. |
| 2015/0010730 A1 | 1/2015 | Faynot et al. |
| 2015/0027052 A1 | 1/2015 | Janssen et al. |
| 2015/0152244 A1 | 6/2015 | Hernandez-Torres |
| 2015/0373936 A1 | 12/2015 | Bouwens et al. |
| 2016/0088809 A1 | 3/2016 | Lowe et al. |
| 2016/0131299 A1 | 5/2016 | Mueller et al. |
| 2016/0143228 A1 | 5/2016 | De Groot et al. |
| 2016/0145779 A1 | 5/2016 | Teng et al. |

(56) References Cited

U.S. PATENT DOCUMENTS

| | | |
|---|---|---|
| 2016/0208439 A1 | 7/2016 | Lelogeay |
| 2016/0208483 A1 | 7/2016 | Takeuchi et al. |
| 2016/0219810 A1 | 8/2016 | Erkkila et al. |
| 2016/0264461 A1 | 9/2016 | Peng et al. |
| 2016/0280971 A1 | 9/2016 | Hampson et al. |
| 2016/0319537 A1 | 11/2016 | Rinne et al. |
| 2017/0022398 A1 | 1/2017 | Lochel, Jr. et al. |
| 2017/0037187 A1 | 2/2017 | Appley et al. |
| 2017/0150684 A1 | 6/2017 | Vuorinen et al. |
| 2017/0150687 A1 | 6/2017 | Loiske et al. |
| 2017/0190902 A1 | 7/2017 | Swift |
| 2017/0197379 A1 | 7/2017 | Teng et al. |
| 2017/0198142 A1 | 7/2017 | Hampson et al. |
| 2017/0210952 A1 | 7/2017 | Hampson et al. |
| 2017/0305783 A1 | 10/2017 | Faynot et al. |
| 2017/0332568 A1 | 11/2017 | Storey |
| 2017/0349718 A1 | 12/2017 | Albani et al. |
| 2017/0368792 A1 | 12/2017 | Faotto |
| 2018/0023291 A1 | 1/2018 | Wiker et al. |
| 2018/0031268 A1 | 2/2018 | Lopez Belbeze et al. |
| 2018/0037273 A1 | 2/2018 | Aarts et al. |
| 2018/0116131 A1 | 5/2018 | Leo |
| 2018/0139911 A1 | 5/2018 | Janssen |
| 2018/0312661 A1 | 11/2018 | Hernandez-Torres et al. |
| 2019/0106563 A1 | 4/2019 | Zhang et al. |
| 2019/0106564 A1 | 4/2019 | Zhang et al. |
| 2019/0124864 A1 | 5/2019 | Bassin et al. |
| 2019/0151771 A1 | 5/2019 | Thomas |
| 2019/0191641 A1 | 6/2019 | Jackson et al. |
| 2019/0259108 A1 | 8/2019 | Bongartz et al. |
| 2019/0330492 A1 | 10/2019 | Swift et al. |
| 2019/0359521 A1 | 11/2019 | Salomon et al. |
| 2019/0382628 A1 | 12/2019 | Alavi et al. |
| 2020/0095712 A1 | 3/2020 | Mueller et al. |
| 2020/0207972 A1 | 7/2020 | Ong et al. |
| 2020/0270404 A1 | 8/2020 | Funakoshi et al. |
| 2021/0095156 A1 | 4/2021 | Swift et al. |
| 2021/0171757 A1 | 6/2021 | Mueller et al. |
| 2021/0172166 A1 | 6/2021 | Grant et al. |
| 2021/0395508 A1 | 12/2021 | Zhang et al. |
| 2022/0064408 A1 | 3/2022 | Zhang et al. |
| 2022/0106492 A1 | 4/2022 | Click et al. |
| 2022/0162410 A1 | 5/2022 | Mueller et al. |
| 2022/0213628 A1 | 7/2022 | Smith et al. |
| 2023/0348682 A1 | 11/2023 | Zhang et al. |

FOREIGN PATENT DOCUMENTS

| | | |
|---|---|---|
| CA | 2391508 A1 | 5/2001 |
| CA | 2834816 A1 | 11/2012 |
| CA | 2604809 C | 4/2013 |
| CN | 102533168 A | 7/2012 |
| EP | 0194242 B1 | 10/1989 |
| EP | 442811 B2 | 12/1993 |
| EP | 583086 B1 | 11/1997 |
| EP | 1022400 A1 | 7/2000 |
| EP | 826710 B1 | 9/2001 |
| EP | 715805 B1 | 7/2002 |
| EP | 1522532 A1 | 4/2005 |
| EP | 1038433 B1 | 6/2008 |
| EP | 2071066 A1 | 6/2009 |
| EP | 2093266 A1 | 8/2009 |
| EP | 2324089 A1 | 5/2011 |
| EP | 2268126 B1 | 4/2012 |
| EP | 1303672 B1 | 2/2015 |
| EP | 2690217 B1 | 3/2015 |
| EP | 2855601 B1 | 9/2016 |
| EP | 3034555 B1 | 4/2017 |
| EP | 2197928 A1 | 5/2017 |
| EP | 2694717 A1 | 6/2017 |
| EP | 2844621 B1 | 6/2017 |
| EP | 1656981 B1 | 1/2018 |
| EP | 1800853 B1 | 2/2018 |
| EP | 2755498 B1 | 2/2018 |
| EP | 2324089 B1 | 3/2018 |
| EP | 2231543 B1 | 9/2018 |
| JP | 2013151777 A | 8/2013 |
| JP | 2017106133 A | 6/2017 |
| JP | 2017226826 A | 12/2017 |
| JP | 2018119140 A | 8/2018 |
| WO | 9204824 A1 | 4/1992 |
| WO | 9318642 A1 | 9/1993 |
| WO | 9961384 A1 | 12/1999 |
| WO | 2004076734 A1 | 9/2004 |
| WO | 2004098270 A1 | 11/2004 |
| WO | 2006136389 A1 | 12/2006 |
| WO | 2007149644 A1 | 12/2007 |
| WO | 2008009460 A1 | 1/2008 |
| WO | 2008009462 A1 | 1/2008 |
| WO | 2008009465 A1 | 1/2008 |
| WO | 2009080822 A1 | 7/2009 |
| WO | 2011044490 A1 | 4/2011 |
| WO | 2012118939 A1 | 9/2012 |
| WO | 2013021234 A1 | 2/2013 |
| WO | 2015144843 A1 | 10/2015 |
| WO | 2016025987 A2 | 2/2016 |
| WO | 2017074853 A1 | 5/2017 |
| WO | 2017084853 A1 | 5/2017 |
| WO | 2017157525 A1 | 9/2017 |
| WO | 2018010558 A1 | 1/2018 |
| WO | 2018158677 A1 | 9/2018 |
| WO | 2019011693 A1 | 1/2019 |
| WO | 2019074867 A1 | 4/2019 |
| WO | 2020144436 A1 | 7/2020 |
| WO | 2021118951 A1 | 6/2021 |
| WO | 2022051213 A1 | 3/2022 |

OTHER PUBLICATIONS

Office Action from JP Application No. 2023-520096 dated Aug. 25, 2025.

Office Action from U.S. Appl. No. 18/815,147 dated Oct. 15, 2024.

Office Action from U.S. Appl. No. 18/815,147 dated Jan. 10, 2025.

Notice of Allowance from U.S. Appl. No. 18/815,147 dated Jul. 24, 2025.

Office Action from AU Application No. 2021352425 dated Nov. 26, 2025.

Office Action from KR Application No. 10-2023-7014850 dated Mar. 12, 2026.

B-STAGEABLE AQUEOUS BINDER COMPOSITIONS

CROSS-REFERENCE TO RELATED APPLICATION(S)

This application claims priority to and any benefit of U.S. Provisional Application No. 63/086,267, filed Oct. 1, 2020, the content of which is incorporated herein by reference in its entirety.

BACKGROUND

Aqueous binder compositions are traditionally utilized in the formation of woven and non-woven fibrous products, such as insulation products, composite products, wood fiber board, and the like. Insulation products, for example fiberglass and mineral wool insulation products, are typically manufactured by fiberizing a molten composition of polymer, glass, or other mineral and spinning fine fibers from a fiberizing apparatus, such as a rotating spinner. To form an insulation product, fibers produced by a rotating spinner are drawn downwardly from the spinner towards a conveyor by a blower. As the fibers move downward, a binder material is sprayed onto the fibers and the fibers are collected into a high loft, continuous blanket on the conveyor. The binder material gives the insulation product resiliency for recovery after packaging and provides stiffness and handleability so that the insulation product can be handled and applied as needed in the insulation cavities of buildings. The binder composition also provides protection to the fibers from interfilament abrasion and promotes compatibility between the individual fibers. The blanket containing the binder-coated fibers is then passed through a curing oven and the binder is cured to set the blanket to a desired thickness.

After the binder has cured, the fiber insulation may be cut into lengths to form individual insulation products, and the insulation products may be packaged for shipping to customer locations.

Fiberglass insulation products prepared in this manner can be provided in various forms including batts, blankets, and boards (heated and compressed batts) for use in different applications. As the batt of binder-coated fibers emerges from the forming chamber, it will tend to expand as a result of the resiliency of the glass fibers. The expanded batt is then typically conveyed to and through a curing oven in which heated air is passed through the insulation product to cure the binder. In addition to curing the binder, within the curing oven, the insulation product may be compressed with flights or rollers to produce the desired dimensions and surface finish on the resulting blanket, batt or board product.

Phenol-formaldehyde (PF) binder compositions, as well as PF resins extended with urea (PUF resins), have been traditionally used in the production of fiberglass insulation products. Insulation boards, also known as "heavy density" products, such as ceiling board, duct wrap, duct liners, and the like have utilized phenol-formaldehyde binder technology for the production of heavy density products that are inexpensive and have acceptable physical and mechanical properties. However, formaldehyde-based binders emit undesirable emissions during the manufacturing of the fiberglass insulation.

As an alternative to formaldehyde-based binders, certain formaldehyde-free formulations have been developed for use as a binder in fibrous insulation products. Common manufacturing processes for fibrous insulation products involve process steps wherein the uncured binder impregnated fiberglass web remains in an uncured state and exposed to ambient conditions for an extended period of time (known as "B-staging"). Such prolonged exposure causes the fibrous insulation product to dry-out and surface-harden, resulting in poor bond formation between the binder composition and the fibers once cured. The cured finished products demonstrate poor tensile strength, due to the poor bonding between the fibers and the binder composition.

Accordingly, there is a need for an environmentally friendly, formaldehyde-free binder composition with improved shelf life and fiber wetting properties, even after extended exposure to prolonged ambient conditions.

SUMMARY

Various exemplary aspects of the inventive concepts are directed to an aqueous binder composition comprising: 5.0% by weight to 50.0% by weight of a monomeric polyol having at least four hydroxyl groups, based on the total solids content of the aqueous binder composition; and at least 50.0% by weight of a cross-linking agent comprising a polymeric polycarboxylic acid having at least two carboxylic acid groups, based on the total solids content of the aqueous binder composition, wherein a ratio of molar equivalents of carboxylic acid groups to hydroxyl groups is between 0.15/1.0 and 2.23/1, or between 0.26/1.0 and 0.75/1. In any of the exemplary embodiments, the aqueous binder composition has a ratio of molar equivalents of carboxylic acid groups to hydroxyl groups that may be between 0.60/1.0 and 1.0/0.6.

The aqueous binder composition has a pH of 2.2 to 4.0 and a viscosity at 40% solids and 25° C. of 10 cP to 60 cP.

In any of the exemplary embodiments, the cross-linking agent may include polyacrylic acid. The cross-linking agent may be present in the binder composition in an amount from 52.0% by weight to 72% by weight, based on the total solids content of the aqueous binder composition.

In any of the exemplary embodiments, the monomeric polyol may comprise at least five hydroxyl groups. The monomeric polyol may comprise one or more of a sugar alcohols, pentaerythritol, primary alcohols, 1,2,4-butanetriol, trimethylolpropane, short-chain alkanolamines, and mixtures thereof. In other exemplary embodiments, the monomeric polyol is selected from the group consisting of pentaerythritol, xylitol, sorbitol, and mixtures thereof.

In any of the exemplary embodiments, the monomeric polyol is present in the binder composition in an amount from 15% by weight to 37% by weight, based on the total solids content of the aqueous binder composition.

In any of the exemplary embodiments, the composition may be free of polymeric polyhydroxy compounds.

In any of the exemplary embodiments, the composition may be free of a monomeric carboxylic acid.

In any of the exemplary embodiments, the aqueous binder composition may have a viscosity at 40% solids and 25° C. of 25 cP to less than 60 cP.

Further embodiments of the present inventive concepts are directed fibrous insulation product comprising a plurality of randomly oriented fibers and a cross-linked formaldehyde-free binder composition at least partially coating the fibers. The cross-linked formaldehyde-free binder composition contains less than 5.5% by weigh of water soluble material and is formed from an aqueous binder composition comprising 5.0% by weight to 50.0% by weight of at least one monomeric polyol having at least four hydroxyl groups, based on the total solids content of the aqueous binder composition; and at least 50.0% by weight of a cross-linking agent comprising a polymeric polycarboxylic acid having at least two carboxylic acid groups, based on the total solids content of the aqueous binder composition. The aqueous binder composition has a pH of 2.2 to 4.0 and a ratio of molar equivalents of carboxylic acid groups to hydroxyl groups that is between 0.15/1.0 and 2.23/1, or between 0.26/1.0 and 0.75/1. In any of the exemplary embodiments, the aqueous binder composition has a ratio of molar equivalents of carboxylic acid groups to hydroxyl groups that may be between 0.60/1.0 and 1.0/0.6.

The fibers may comprise one or more of mineral fibers, natural fibers, and synthetic fibers. For example, the fibers may comprise glass fibers, mineral wool fibers, or a mixture thereof.

In any of the exemplary embodiments, the binder composition may be free of polymeric polyhydroxy compounds.

In any of the exemplary embodiments, the ratio of molar equivalents of carboxylic acid groups to hydroxyl groups may be between 0.80/1.0 and 1.0/0.8

In any of the exemplary embodiments, the monomeric polyol may comprise one or more of a sugar alcohols, pentaerythritol, primary alcohols, 1,2,4-butanetriol, trimethylolpropane, short-chain alkanolamines, and mixtures thereof.

Yet further embodiments of the present inventive concepts are directed to B-stageable fibrous insulation product comprising a plurality of randomly oriented fibers; and an uncured aqueous binder composition at least partially coating the fibers. The aqueous binder composition comprises 5.0% by weight to 37.0% by weight of at least one monomeric polyol having at least four hydroxyl groups, based on the total solids content of the aqueous binder composition; and at least 50.0% by weight of a cross-linking agent comprising a polymeric polycarboxylic acid having at least two carboxylic acid groups, based on the total solids content of the aqueous binder composition. The uncured aqueous binder composition has a viscosity at 40% solids and 25° C. of 10 cP to 60 cP. Additionally, the B-stageable fibrous insulation product has a drying time, as measured by a CEM Smart 6 moisture analyzer, of at least 500 seconds.

In any of the exemplary embodiments, the uncured aqueous binder composition may have a viscosity at 40% solids and 25° C. of 30 cP to 45 cP.

In any of the exemplary embodiments, the cross-linking agent may be a homopolymer or copolymer of acrylic acid, such as polyacrylic acid.

In any of the exemplary embodiments, the aqueous binder composition may have a pH of 2.2 to 4.0.

In any of the exemplary embodiments, the aqueous binder composition may have a ratio of molar equivalents of carboxylic acid groups to hydroxyl groups is between a ratio of molar equivalents of carboxylic acid groups to hydroxyl groups that is between 0.15/1.0 and 2.23/1, or between 0.26/1.0 and 0.75/1. In any of the exemplary embodiments, the aqueous binder composition has a ratio of molar equivalents of carboxylic acid groups to hydroxyl groups that may be between 0.60/1.0 and 1.0/0.6.

In any of the exemplary embodiments, the monomeric polyol comprises one or more of a sugar alcohols, pentaerythritol, primary alcohols, 1,2,4-butanetriol, trimethylolpropane, short-chain alkanolamines, and mixtures thereof.

In any of the exemplary embodiments, the composition is free of polymeric polyhydroxy compounds.

In any of the exemplary embodiments, the composition is free of a monomeric carboxylic acid.

Yet further embodiments of the present inventive concepts are directed to a method for producing a fibrous insulation product having a low level of water soluble material, comprising applying a formaldehyde-free aqueous binder composition to a plurality of fibers. The formaldehyde-free aqueous binder composition comprises 5.0% by weight to 50.0% by weight of at least one monomeric polyol having at least four hydroxyl groups, based on the total solids content of the aqueous binder composition; and at least 50.0% by weight of a cross-linking agent comprising a polymeric polycarboxylic acid having at least two carboxylic acid groups, based on the total solids content of the aqueous binder composition. The method further includes gathering the fibers onto a substrate, forming a binder-infused fibrous pack; and curing the binder-infused fibrous pack, wherein the fibrous insulation product contains less than 5.5% by weight of water soluble material.

In any of the exemplary embodiments, the formaldehyde-free aqueous binder composition may comprise a ratio of molar equivalents of carboxylic acid groups to hydroxyl groups between 0.15/1.0 and 2.23/1, or between 0.26/1.0 and 0.75/1. In any of the exemplary embodiments, the aqueous binder composition has a ratio of molar equivalents of carboxylic acid groups to hydroxyl groups that may be between 0.60/1.0 and 1.0/0.6.

In any of the exemplary embodiments, the formaldehyde-free aqueous binder composition may have a pH of 2.2 to 4.0.

In any of the exemplary embodiments, the formaldehyde-free aqueous binder composition may have a viscosity at 40% solids and 25° C. of 10 cP to 60 cP.

Yet further embodiments of the present inventive concepts are directed to a process for B-staging a fibrous insulation precursor that includes applying a formaldehyde-free aqueous binder composition to a plurality of fibers, forming a binder-impregnated fibrous insulation precursor, exposing the binder-impregnated fibrous insulation precursor to ambient temperatures for at least 500 seconds, forming a B-staged fibrous precursor without the binder composition forming a film on a surface of the fibrous insulation precursor. The binder composition comprises 5.0% by weight to 50.0% by weight of at least one monomeric polyol having at least four hydroxyl groups, based on the total solids content of the aqueous binder composition; and at least 50.0% by weight of a cross-linking agent comprising a polymeric polycarboxylic acid having at least two carboxylic acid groups, based on the total solids content of the aqueous binder composition.

Yet further embodiments of the present inventive concepts are directed to an aqueous formaldehyde-free binder composition comprising 5.0% by weight to 50.0% by weight of at least one monomeric polyol having at least four hydroxyl groups, 50.0% by weight to 62% by weight of a polyacrylic acid crosslinking agent; 0.5% to 5.0% by weight a catalyst; 2.0% to, 15.0% by weight of a processing aid; 0 to 5.0% by weight of a surfactant; 0 to 2.0% by weight of a pigment; and 0 to 15% by weight of silicone, based on the total solids content of the aqueous binder composition. The aqueous binder composition includes a ratio of molar equivalents of carboxylic acid groups to hydroxyl groups that is between 0.15/1.0 and 2.23/1, or between 0.26/1.0 and 0.75/1. In any of the exemplary embodiments, the aqueous binder composition has a ratio of molar equivalents of carboxylic acid groups to hydroxyl groups that may be between 0.60/1.0 and 1.0/0.6. The aqueous binder composition has a pH of 2.2 to 4.0 and a viscosity at 40% solids and 25° C. of 30 cP to 55 cP.

Numerous other aspects, advantages, and/or features of the general inventive concepts will become more readily apparent from the following detailed description of exemplary embodiments and from the accompanying drawings being submitted herewith.

BRIEF DESCRIPTION OF THE DRAWINGS

The general inventive concepts, as well as illustrative embodiments and advantages thereof, are described below in greater detail, by way of example, with reference to the drawings in which.

DETAILED DESCRIPTION

Figure 1:
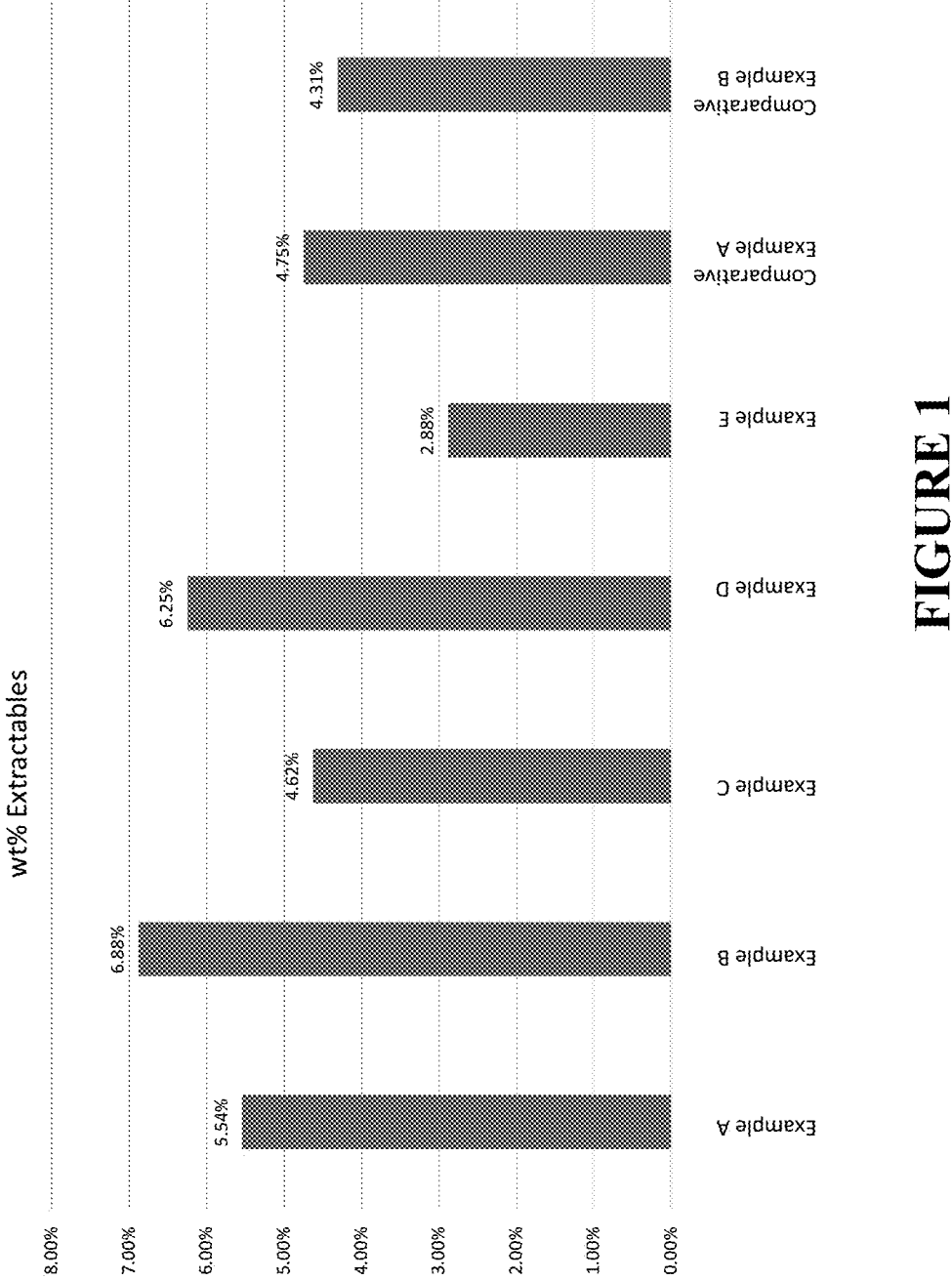
FIG. 1 graphically illustrates the weight percent of extractable solids, based on a cured binder composition.

Unless otherwise defined, all technical and scientific terms used herein have the same meaning as commonly understood by one of ordinary skill in the art to which these exemplary embodiments belong. The terminology used in the description herein is for describing exemplary embodiments only and is not intended to be limiting of the exemplary embodiments. Accordingly, the general inventive concepts are not intended to be limited to the specific embodiments illustrated herein. Although other methods and materials similar or equivalent to those described herein can be used in the practice or testing of the present invention, the preferred methods and materials are described herein.

As used in the specification and the appended claims, the singular forms "a," "an," and "the" are intended to include the plural forms as well, unless the context clearly indicates otherwise.

By "substantially free" it is meant that a composition includes less than 1.0 wt. % of the recited component, including no greater than 0.8 wt. %, no greater than 0.6 wt. %, no greater than 0.4 wt. %, no greater than 0.2 wt. %, no greater than 0.1 wt. %, and no greater than 0.05 wt. %. In any of the exemplary embodiments, "substantially free" means that a composition includes no greater than 0.01 wt. % of the recited component.

Unless otherwise indicated, all numbers expressing quantities of ingredients, chemical and molecular properties, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments. At the very least each numerical parameter should be construed in light of the number of significant digits and ordinary rounding approaches.

Unless otherwise indicated, any element, property, feature, or combination of elements, properties, and features, may be used in any embodiment disclosed herein, regardless of whether the element, property, feature, or combination of elements, properties, and features was explicitly disclosed in the embodiment. It will be readily understood that features described in relation to any particular aspect described herein may be applicable to other aspects described herein provided the features are compatible with that aspect. In particular: features described herein in relation to the method may be applicable to the fibrous product and vice versa; features described herein in relation to the method may be applicable to the aqueous binder composition and vice versa; and features described herein in relation to the fibrous product may be applicable to the aqueous binder composition and vice versa.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and claims will include every narrower numerical range that falls within such broader numerical range, as if such narrower numerical ranges were all expressly written herein.

The present disclosure relates to formaldehyde-free or "no added formaldehyde" aqueous binder compositions for use with inorganic fibers, such as glass or mineral wool fibers. As used herein, the terms "binder composition," "aqueous binder composition," "binder formulation," "binder," and "binder system" may be used interchangeably and are synonymous. Additionally, as used herein, the terms "formaldehyde-free" or "no added formaldehyde" may be used interchangeably and are synonymous.

The present disclosure relates to formaldehyde-free aqueous binder compositions for use in the manufacture of insulation products that have comparable or improved mechanical and physical performance, compared to products manufactured with traditional formaldehyde-based binder compositions. The formaldehyde-free binder composition may be used in the manufacture of fibrous insulation products and related products, such as thin fiber-reinforced mats (all hereinafter referred to generically as fibrous insulation products) and glass fiber or mineral wool products, especially fiberglass or mineral wool insulation products, made with the cured formaldehyde-free binder. Other products may include composite products, wood fiber board products, metal building insulation, pipe insulation, ceiling board, ceiling tile, "heavy density" products, such as board products including, for example, ceiling board, duct board, foundation boards, pipe and tank insulation, sound absorption boards, acoustical panels, general board products, duct liners, and also "light density" products including, for example, residential insulation, duct wrap, metal building insulation, flexible duct media. Further fibrous products include non-woven fiber mats and particle boards, and composite products manufactured therefrom.

The present inventive concepts are based on the surprising discovery of an improved formaldehyde-free binder composition comprising a polycarboxylic acid-based cross-linking agent and at least one polyol comprising at least three hydroxyl groups, or at least four hydroxyl groups. The subject binder composition demonstrates an unexpected increase in cross-linking density, which then leads to unique performance properties, including a reduced level of water soluble material post-cure, higher water retention, and improved water/vapor resistance.

Non-limiting examples of suitable cross-linking agents include polycarboxylic acid-based materials having one or more carboxylic acid groups (—COOH), such as mono-meric and polymeric polycarboxylic acids, including salts or anhydrides thereof, and mixtures thereof. In any of the exemplary embodiments, the polycarboxylic acid may be a polymeric polycarboxylic acid, such as a homopolymer or copolymer of acrylic acid. The polymeric polycarboxylic acid may comprise polyacrylic acid (including salts or anhydrides thereof) and polyacrylic acid-based resins such as QR-1629S and Acumer 9932, both commercially avail-able from The Dow Chemical Company, polyacrylic acid compositions commercially from CH Polymer, and poly-acrylic acid compositions commercially available from Coa-tex. Acumer 9932 is a polyacrylic acid/sodium hypophos-phite resin having a molecular weight of about 4000 and a sodium hypophosphite content of 6-7% by weight, based on the total weight of the polyacrylic acid/sodium hypophos-phite resin. QR-1629S is a polyacrylic acid/glycerin resin composition.

The cross-linking agent may, in some instances, be pre-neutralized with a neutralization agent. Such neutralization agents may include organic and/or inorganic bases, such sodium hydroxide, ammonium hydroxide, and diethylam-ine, and any kind of primary, secondary, or tertiary amine (including alkanol amine). In any of the embodiments dis-closed herein, the neutralization agents may include at least one of sodium hydroxide and triethanolamine.

The cross-linking agent is present in the aqueous binder composition in at least 25.0% by weight, based on the total solids content of the aqueous binder composition, including, without limitation at least 30% by weight, at least 40% by weight, at least 45% by weight, at least 50% by weight, at least 52.0% by weight, at least 54.0% by weight, at least 56.0% by weight, at least 58.0% by weight, and at least 60.0% by weight. In any of embodiments disclosed herein, the cross-linking agent is present in the aqueous binder composition in an amount from 27% to 85% by weight, based on the total solids content of the aqueous binder composition, including without limitation 30% to 80% by weight, 50.0% to 70.0% by weight, greater than 50% by weight to 65% by weight, 52.0% to 62.0% by weight, 54.0% to 60.0% by weight, and 55.0% to 59.0% by weight.

The aqueous binder composition further includes a polyol comprising at least three hydroxyl groups. The polyol may comprise a water-soluble compound having a molecular weight of less than 2,000 Daltons, including less than 750 Daltons, less than 500 Daltons, less than 250 Daltons, less than 200 Daltons, or less than 175 Daltons. In any of the embodiments disclosed herein, the polyol may comprise a monomeric polyol. Suitable polyol components include sugar alcohols, pentaerythritol, primary alcohols, 1,2,4-bu-tanetriol, trimethylolpropane, and short-chain alkano-lamines, such as triethanolamine, comprising at least three hydroxyl groups. In any of the embodiments disclosed herein, the polyol may comprise at least 4 hydroxyl groups, or at least five hydroxyl groups.

Sugar alcohol is understood to mean compounds obtained when the aldo or keto groups of a sugar are reduced (e.g. by hydrogenation) to the corresponding hydroxy groups. The starting sugar might be chosen from monosaccharides, oli-gosaccharides, and polysaccharides, and mixtures of those products, such as syrups, molasses and starch hydrolyzates. The starting sugar also could be a dehydrated form of a sugar. Although sugar alcohols closely resemble the corre-sponding starting sugars, they are not sugars. Thus, for instance, sugar alcohols have no reducing ability, and cannot participate in the Maillard reaction typical of reducing sugars. In some exemplary embodiments, the sugar alcohol includes erythritol, arabitol, xylitol, sorbitol, maltitol, man-nitol, iditol, isomaltitol, lactitol, cellobitol, palatinitol, maltotritol, syrups thereof and mixtures thereof. In various exemplary embodiments, the sugar alcohol is selected from sorbitol, xylitol, syrups thereof, or mixtures thereof. In some exemplary embodiments, the polyol is a dimeric or oligo-meric condensation product of a sugar alcohol.

In some exemplary embodiments, the polyol is present in the aqueous binder composition in an amount up to about 75% by weight or about 70% by weight total solids, includ-ing without limitation, up to about 68%, 65%, 60%, 55%, 50%, 45%, 40%, 35%, 33%, 30%, 27%, 25%, and 20% by weight total solids. In some exemplary embodiments, the polyol is present in the aqueous binder composition in an amount from 2.0% to 69.0% by weight total solids, includ-ing without limitation 5.0% to 60.0%, 8.0% to 57.0%, 10.0% to 54.0%, 12.0% to 52.0%, 15.0% to 50.0%, and 20.0% to 48.0%, by weight total solids.

In various exemplary embodiments, the cross-linking agent and polyol are present in amounts such that the ratio of the number of molar equivalents of carboxylic acid groups, anhydride groups, or salts thereof to the number of molar equivalents of hydroxyl groups is from about 0.07/1 to about 2.23/1, such as from about 0.17/1 to about 1/0.6, or from about 0.32/1 to about 0.92/1, or from about 0.4/1 to 0.6/1. In any of the exemplary embodiments, the aqueous binder composition has a ratio of molar equivalents of carboxylic acid groups to hydroxyl groups that may be between 0.60/1.0 and 1.0/0.6, or between 0.80/1 and 1.0/0.80.

In any of the embodiments disclosed herein, the aqueous binder composition may be free or substantially free of polyols comprising less than 3 hydroxyl groups, or free or substantially free of polyols comprising less than 4 hydroxyl groups. In any of the embodiments disclosed herein, the aqueous binder composition is free or substantially free of polyols having a number average molecular weight of 2,000 Daltons or above, such as a molecular weight between 3,000 Daltons and 4,000 Daltons. Accordingly, in any of the embodiments disclosed herein, the aqueous binder compo-sition is free or substantially free of diols, such as glycols; triols, such as, for example, glycerol and triethanolamine; and/or polymeric polyhydroxy compounds, such as polyvi-nyl alcohol, polyvinyl acetate, which may be partially or fully hydrolyzed, or mixtures thereof. Polyvinyl alcohol is a known film former, which causes moisture to release quickly, leading to the formation of a film. It is believed that shorter chain polyols do not form a film as quickly, which improves the B-stageability of a product.

In any of the embodiments disclosed herein, the aqueous binder compositions may comprise or consist of a polymeric polycarboxylic acid-based cross-linking agent and a mono-meric polyol having at least four hydroxyl groups with a ratio of carboxylic acid groups to hydroxyl groups OH groups between 0.60/1 to 1/0.6.

Optionally, the aqueous binder composition may include an esterification catalyst, also known as a cure accelerator. The catalyst may include inorganic salts, Lewis acids (i.e., aluminum chloride or boron trifluoride), Bronsted acids (i.e., sulfuric acid, p-toluenesulfonic acid and boric acid) orga-nometallic complexes (i.e., lithium carboxylates, sodium carboxylates), and/or Lewis bases (i.e., polyethyleneimine, diethylamine, or triethylamine). Additionally, the catalyst may include an alkali metal salt of a phosphorous-containing organic acid; in particular, alkali metal salts of phosphorus acid, hypophosphorus acid, or polyphosphoric. Examples of such phosphorus catalysts include, but are not limited to, sodium hypophosphite, sodium phosphate, potassium phosphate, disodium pyrophosphate, tetrasodium pyrophosphate, sodium tripolyphosphate, sodium hexametaphosphate, potassium phosphate, potassium tripolyphosphate, sodium trimetaphosphate, sodium tetrametaphosphate, and mixtures thereof. In addition, the catalyst or cure accelerator may be a fluoroborate compound such as fluoroboric acid, sodium tetrafluoroborate, potassium tetrafluoroborate, calcium tetrafluoroborate, magnesium tetrafluoroborate, zinc tetrafluoroborate, ammonium tetrafluoroborate, and mixtures thereof. Further, the catalyst may be a mixture of phosphorus and fluoroborate compounds. Other sodium salts such as, sodium sulfate, sodium nitrate, sodium carbonate may also or alternatively be used as the catalyst.

The catalyst may be present in the aqueous binder composition in an amount up to about 10.0% by weight of the total solids in the binder composition, including without limitation, amounts from about 1.0% to about 5.0% by weight, or from about 1.5% to about 4.5% by weight, or from about 1.7% to about 4.0% by weight, or from about 2.0% to about 3.5% by weight.

Optionally, the aqueous binder composition may contain at least one coupling agent. In at least one exemplary embodiment, the coupling agent is a silane coupling agent. The coupling agent(s) may be present in the binder composition in an amount from about 0.01% to about 5.0% by weight of the total solids in the binder composition, from about 0.01% to about 2.5% by weight, from about 0.05% to about 1.5% by weight, or from about 0.1% to about 1.0% by weight.

Non-limiting examples of silane coupling agents that may be used in the binder composition may be characterized by the functional groups alkyl, aryl, amino, epoxy, vinyl, methacryloxy, ureido, isocyanato, and mercapto. In any of the embodiments, the silane coupling agent(s) may include silanes containing one or more nitrogen atoms that have one or more functional groups such as amine (primary, secondary, tertiary, and quaternary), amino, imino, amido, imido, ureido, or isocyanato. Specific, non-limiting examples of suitable silane coupling agents include, but are not limited to, aminosilanes (e.g., triethoxyaminopropylsilane; 3-aminopropyl-triethoxysilane and 3-aminopropyl-trihydroxysilane), epoxy trialkoxysilanes (e.g., 3-glycidoxypropylt-rimethoxysilane and 3-glycidoxypropyltriethoxysilane), methyacryl trialkoxysilanes (e.g., 3-methacryloxypropylt-rimethoxysilane and 3-methacryloxypropyltriethoxysilane), hydrocarbon trialkoxysilanes, amino trihydroxysilanes, epoxy trihydroxysilanes, methacryl trihydroxy silanes, and/or hydrocarbon trihydroxysilanes. In any of the embodiments disclosed herein, the silane may comprise an aminosilane, such as γ-aminopropyltriethoxysilane.

The aqueous binder composition may further include a process aid. The process aid is not particularly limiting so long as the process aid functions to facilitate the processing of the fibers formation and orientation. The process aid can be used to improve binder application distribution uniformity, to reduce binder viscosity, to increase ramp height after forming, to improve the vertical weight distribution uniformity, and/or to accelerate binder de-watering in both forming and oven curing process. The process aid may be present in the binder composition in an amount from 0 to about 10.0% by weight, from about 0.1% to about 5.0% by weight, or from about 0.3% to about 2.0% by weight, or from about 0.4% by weight to 1.5% by weight, or from about 0.5% to 1.0% by weight, based on the total solids content in the binder composition. In some exemplary embodiments, the aqueous binder composition is substantially or completely free of any process aids.

Examples of process aids include defoaming agents, such as, emulsions and/or dispersions of mineral, paraffin, or vegetable oils; dispersions of polydimethylsiloxane (PDMS) fluids, and silica which has been hydrophobized with polydimethylsiloxane or other materials. Further process aids may include particles made of amide waxes such as ethylene bis-stearamide (EBS) or hydrophobized silica. A further process aid that may be utilized in the binder composition is a surfactant. One or more surfactants may be included in the binder composition to assist in binder atomization, wetting, and interfacial adhesion.

The surfactant is not particularly limited, and includes surfactants such as, but not limited to, ionic surfactants (e.g., sulfate, sulfonate, phosphate, and carboxylate); sulfates (e.g., alkyl sulfates, ammonium lauryl sulfate, sodium lauryl sulfate (SDS), alkyl ether sulfates, sodium laureth sulfate, and sodium myreth sulfate); amphoteric surfactants (e.g., alkylbetaines such as lauryl-betaine); sulfonates (e.g., dioctyl sodium sulfosuccinate, perfluorooctanesulfonate, perfluorobutanesulfonate, and alkyl benzene sulfonates); phosphates (e.g., alkyl aryl ether phosphate and alkyl ether phosphate); carboxylates (e.g., alkyl carboxylates, fatty acid salts (soaps), sodium stearate, sodium lauroyl sarcosinate, carboxylate fluorosurfactants, perfluoronanoate, and perfluorooctanoate); cationic (e.g., alkylamine salts such as laurylamine acetate); pH dependent surfactants (primary, secondary or tertiary amines); permanently charged quaternary ammonium cations (e.g., alkyltrimethylammonium salts, cetyl trimethylammonium bromide, cetyl trimethylammonium chloride, cetylpyridinium chloride, and benzethonium chloride); and zwitterionic surfactants, quaternary ammonium salts (e.g., lauryl trimethyl ammonium chloride and alkyl benzyl dimethylammonium chloride), and polyoxyethylenealkylamines.

Suitable nonionic surfactants that can be used in conjunction with the binder composition include polyethers (e.g., ethylene oxide and propylene oxide condensates, which include straight and branched chain alkyl and alkaryl polyethylene glycol and polypropylene glycol ethers and thioethers); alkylphenoxypoly(ethyleneoxy)ethanols having alkyl groups containing from about 7 to about 18 carbon atoms and having from about 4 to about 240 ethyleneoxy units (e.g., heptylphenoxypoly(ethyleneoxy) ethanols, and nonylphenoxypoly(ethyleneoxy) ethanols); polyoxyalkylene derivatives of hexitol including sorbitans, sorbides, mannitans, and mannides; partial long-chain fatty acids esters (e.g., polyoxyalkylene derivatives of sorbitan monolaurate, sorbitan monopalmitate, sorbitan monostearate, sorbitan tristearate, sorbitan monooleate, and sorbitan trioleate); condensates of ethylene oxide with a hydrophobic base, the base being formed by condensing propylene oxide with propylene glycol; sulfur containing condensates (e.g., those condensates prepared by condensing ethylene oxide with higher alkyl mercaptans, such as nonyl, dodecyl, or tetradecyl mercaptan, or with alkylthiophenols where the alkyl group contains from about 6 to about 15 carbon atoms); ethylene oxide derivatives of long-chain carboxylic acids (e.g., lauric, myristic, palmitic, and oleic acids, such as tall oil fatty acids); ethylene oxide derivatives of long-chain alcohols (e.g., octyl, decyl, lauryl, or cetyl alcohols); and ethylene oxide/propylene oxide copolymers.

In at least one exemplary embodiment, the surfactants include one or more of Dynol 607, which is a 2,5,8,11-tetramethyl-6-dodecyne-5,8-diol, SURFONYL® 420, SUR- FONYL® 440, and SURFONYL® 465, which are ethoxylated 2,4,7,9-tetramethyl-5-decyn-4,7-diol surfactants (commercially available from Evonik Corporation (Allentown, Pa.)), Stanfax (a sodium lauryl sulfate), Surfynol 465 (an ethoxylated 2,4,7,9-tetramethyl 5 decyn-4,7-diol), Triton™ GR-PG70 (1,4-bis(2-ethylhexyl) sodium sulfosuccinate), and Triton™ CF-10 (poly(oxy-1,2-ethanediyl), alpha-(phenylmethyl)-omega-(1,1,3,3-tetramethylbutyl)phenoxy).

Optionally, the aqueous binder composition may contain a dust suppressing agent to reduce or eliminate the presence of inorganic and/or organic particles which may have adverse impact in the subsequent fabrication and installation of the insulation materials. The dust suppressing agent can be any conventional mineral oil, mineral oil emulsion, natural or synthetic oil, bio-based oil, or lubricant, such as, but not limited to, silicone and silicone emulsions, polyethylene glycol, as well as any petroleum or non-petroleum oil with a high flash point to minimize the evaporation of the oil inside the oven.

The aqueous binder composition may include up to about 15 wt. % of a dust suppressing agent, including up to about 14 wt. %, or up to about 13 wt. %. In any of the embodiments disclosed herein, the aqueous binder composition may include between 1.0 wt. % and 15 wt. % of a dust suppressing agent, including about 3.0 wt. % to about 13.0 wt. %, or about 5.0 wt. % to about 12.8 wt. %.

The aqueous binder composition may also optionally include organic and/or inorganic acids and bases as pH adjusters in an amount sufficient to adjust the pH to a desired level. The pH may be adjusted depending on the intended application, to facilitate the compatibility of the ingredients of the binder composition, or to function with various types of fibers. In some exemplary embodiments, the pH adjuster is utilized to adjust the pH of the binder composition to an acidic pH. Examples of suitable acidic pH adjusters include inorganic acids such as, but not limited to sulfuric acid, phosphoric acid and boric acid and also organic acids like p-toluenesulfonic acid, mono- or polycarboxylic acids, such as, but not limited to, citric acid, acetic acid and anhydrides thereof, adipic acid, oxalic acid, and their corresponding salts. Also, inorganic salts that can be acid precursors. The acid adjusts the pH, and in some instances, as discussed above, acts as a cross-linking agent. Organic and/or inorganic bases can be included to increase the pH of the binder composition. The bases may be volatile or non-volatile bases. Exemplary volatile bases include, for example, ammonia and alkyl-substituted amines, such as methyl amine, ethyl amine or 1-aminopropane, dimethyl amine, and ethyl methyl amine. Exemplary non-volatile bases include, for example, sodium hydroxide, potassium hydroxide, sodium carbonate, and t-butylammonium hydroxide.

When in an un-cured state, the pH of the binder composition may range from about 2.0 to about 5.0, including all amounts and ranges in between. In any of the embodiments disclosed herein, the pH of the binder composition, when in an un-cured state, is about 2.2-4.0, including about 2.5-3.8, and about 2.6-3.5. After cure, the pH of the binder composition may rise to at least a pH of 5.0, including levels between about 6.5 and 8.8, or between about 6.8 and 8.2.

The binder further includes water to dissolve or disperse the active solids for application onto the reinforcement fibers. Water may be added in an amount sufficient to dilute the aqueous binder composition to a viscosity that is suitable for its application to the reinforcement fibers and to achieve a desired solids content on the fibers. It has been discovered that the present binder composition may contain a lower solids content than traditional phenol-urea formaldehyde or carbohydrate-based binder compositions. In particular, the binder composition may comprise 5% to 35% by weight of binder solids, including without limitation, 8% to 30%, 10% to 25%, 12% to 20%, and 15% to 19% by weight of binder solids. This level of solids indicates that the subject binder composition may include more water than traditional binder compositions.

However, due to the high cure rate of the binder composition, the binder can be processed at a high ramp moisture level (about 8%-10%) and the binder composition requires less moisture removal than traditional binder compositions. The binder content may be measured as loss on ignition (LOI). In any of the embodiments disclosed herein, the LOI is 1% to 20%, including without limitation, 5.5% to 17%, 8% to 15%, and 10% to 14.5%. The particular LOI of a product is largely dependent on the type of product being produced.

In any of the embodiments disclosed herein, the aqueous binder composition may also include one or more additives, such as a coupling agent, an extender, a cross-linking density enhancer, a deodorant, an antioxidant, a dust suppressing agent, a biocide, a moisture resistant agent, or combinations thereof. Optionally, the binder may comprise, without limitation, dyes, pigments, additional fillers, colorants, UV stabilizers, thermal stabilizers, anti-foaming agents, emulsifiers, preservatives (e.g., sodium benzoate), corrosion inhibitors, and mixtures thereof. Other additives may be added to the binder composition for the improvement of process and product performance. Such additives include lubricants, wetting agents, antistatic agents, and/or water repellent agents. Additives may be present in the binder composition from trace amounts (such as < about 0.1% by weight the binder composition) up to about 10% by weight of the total solids in the binder composition.

In any of the embodiments disclosed herein, the aqueous binder composition may be free or substantially free of a monomeric carboxylic acid component. Exemplary monomeric polycarboxylic acid components include aconitic acid, adipic acid, azelaic acid, butane tetra carboxylic acid dihydrate, butane tricarboxylic acid, chlorendic anhydride, citraconic acid, citric acid, dicyclopentadiene-maleic acid adducts, diethylenetriamine pentacetic acid pentasodium salt, adducts of dipentene and maleic anhydride, endomethylenehexachlorophthalic anhydride, ethylenediamine tetraacetic acid (EDTA), fully maleated rosin, maleated tall oil fatty acids, fumaric acid, glutaric acid, isophthalic acid, itaconic acid, maleated rosin-oxidize unsaturation with potassium peroxide to alcohol then carboxylic acid, malic acid, maleic anhydride, mesaconic acid, oxalic acid, phthalic anhydride, polylactic acid, sebacic acid, succinic acid, tartaric acid, terephthalic acid, tetrabromophthalic anhydride, tetrachlorophthalic anhydride, tetrahydrophthalic anhydride, trimellitic anhydride, and trimesic acid.

In any of the embodiments disclosed herein, the binder composition may be free of reducing sugars. A reducing sugar is a type of carbohydrate or sugar that includes a free aldehyde or ketone group and can donate electrons to another molecule. As the binder composition is free of reducing sugars, it is unable to participate in a Maillard reaction, which is a process that occurs when a reducing sugar reacts with an amine. The Maillard reaction results in a binder composition with a brown color, which is undesirable for the subject binder composition.

The aqueous binder composition includes a polycarboxylic acid-based cross-linking agent (e.g., polymeric polycarboxylic acid) and a polyol with at least four hydroxyl groups (e.g. a sugar alcohol). Exemplary aqueous binder compositions are illustrated below in Table 1.

TABLE 1

| Component | Exemplary Range 1 (% By Weight of Total Solids) | Exemplary Range 2 (% by Weight of Total Solids) | Exemplary Range 3 (% By Weight of Total Solids) |
|---|---|---|---|
| Polycarboxylic acid | 30-85 | 40-65 | 50-60 |
| Polyol | 15-70 | 35-60 | 40-50 |
| Ratio of COOH/OH groups | 0.15/1-2.23/1 | 0.26/1-0.75/1 | 0.39/1-0.6/1 |

Aqueous binder compositions according to various exemplary embodiments of the present disclosure may further include additional components, such as a catalyst/accelerator (e.g., sodium hypophosphite), a surfactant, and/or a coupling agent (e.g., silane). Exemplary binder compositions comprising such additional components are set forth below in Table 2.

TABLE 2

| Component | Exemplary Range 1 (% By Weight of Total Solids) | Exemplary Range 2 (% By Weight of Total Solids) | Exemplary Range 3 (% By Weight of Total Solids) |
|---|---|---|---|
| Polycarboxylic acid | 30-85 | 45-65 | 50-60 |
| Polyol | 15-70 | 35-55 | 40-50 |
| Catalyst | 0.5-5.0 | 1.0-3.5 | 2.0-3.0 |
| Coupling agent | 0-2.0 | 0-1.0 | 0.12-0.5 |
| Oil Emulsion | 2-15 | 2-15 | 8-13 |
| Surfactant | 0-5.0 | 0.2-1.5 | 0.1-1.0 |
| Pigment | 0-2 | 0-1.5 | 0.1-1.0 |
| Silicone | 0-15 | 0-10 | 0.5-10.0 |

The aqueous binder composition is formulated to have a reduced level of water soluble material post-cure as determined by extracting water-soluble materials with deionized water for 2 hours at room temperature using about 1000 g of deionized water per about 1 gram of binder. The higher the level of water soluble material after cure, the more likely it is that a cured material suffers from leaching if/when exposed to water and/or a hot/humid environment. In some exemplary embodiments, the binder composition has no greater than 6% by weight of water soluble material after cure. In some exemplary embodiments, the binder composition has less than 5.5% by weight water soluble material after cure, including less than 5.0% by weight, 4.0 wt. %, 3.0% by weight, less than 2.5% by weight, less than 2.0% by weight less than 1.5% by weight, or less than 1.0% by weight. It has been discovered that reducing the level of water soluble material after cure to no greater than 6.0% by weight, will improve the tensile strength of the binder composition, as compared to an otherwise similar binder composition having greater than 6.0% by weight, water soluble material after cure.

Additionally, the subject aqueous binder compositions has a viscosity that provides a precise balance between binder viscosity, reduced emissions, and improved product performance. As illustrated below in Table 3, aqueous binder compositions in accordance with the present inventive concepts demonstrate a viscosity, at a temperature of 25° C., of at least 10 cP at 40% solids, including at least 15 cP at 40% solids, at least 20 cP at 40% solids, at least 30 cP at 40% solids. In any of the embodiments disclosed herein, the viscosity of the binder composition is no greater than 60 cP at 25° C. and 40% solids or less, such as no greater than 55 cP, no greater than 50 cP, no greater than 45 cP, or no greater than 40 cP. In contrast, as illustrated in Comparative Examples 2 and 4 in Table 3, binder compositions comprising a monomeric carboxylic acid and sorbitol demonstrate viscosities at 40% solids and 25° C. is less than 10 cP. Additionally, Comparative Examples 1 and 3 comprise binder compositions including polyacrylic acid, sorbitol, and polyvinyl alcohol demonstrate viscosities at 40% solids and 25° C. of at least 60 cP, and upwards of 67.5 cP. In contrast, the binder compositions of Examples 1-6 each demonstrate viscosities at 40% solids and 25° C. greater than 10 cP and less than 60 cP, which provides a particularly beneficial viscosity range.

Additionally, in any of the exemplary embodiments, the aqueous binder composition emits no or essentially non-detectable isocyanate emissions during fibrous insulation manufacturing processes.

TABLE 3

| (% By Weight of Total Solids) | Polyacrylic acid | Citric Acid | Sorbitol | PVOH | SHP | Dynol surfactant | Silquest Y-15612 | Viscosity (Avg.) (cP) |
|---|---|---|---|---|---|---|---|---|
| Example 1 | 70.87 | — | 29.13 | — | — | — | — | 42.9 |
| Example 2 | 80.58 | — | 19.42 | — | — | — | — | 58.2 |
| Example 3 | 61.54 | — | 38.46 | — | — | — | — | 31.0 |
| Example 4 | 70.40 | — | 28.93 | — | — | 0.48 | 0.186 | 43.5 |
| Example 5 | 80.04 | — | 19.29 | — | — | 0.48 | 0.186 | 59.2 |
| Example 6 | 61.13 | — | 38.21 | — | — | 0.48 | — | 32.3 |
| Example 7 | 49.02 | — | 48.08 | — | 2.42 | 0.48 | — | 36.4 |
| Example 8 | 35.28 | — | 62.50 | — | 1.74 | 0.48 | — | 24.0 |
| Example 9 | 29.29 | — | 68.81 | — | 1.44 | 0.46 | — | 21.6 |
| Comp. Example 1 | 68.87 | — | 28.30 | 2.83 | — | — | — | 67.5 |
| Comp. Example 2 | — | 55.24 | — | 40.0 | 4.76 | — | — | 7.1 |
| Comp. Example 3 | 68.42 | — | 28.12 | 2.81 | — | 0.47 | 0.186 | 63.3 |
| Comp. Example 4 | — | 54.87 | 39.74 | — | 4.73 | 0.38 | — | 8.2 |

The binder compositions disclosed herein may be used to manufacture fibrous insulation products, such as fiberglass or mineral wool insulation products. Thus, aspects of the present inventive concepts are also directed to a method for producing an insulation product and includes the steps of contacting fibers with a binder composition as disclosed herein. The insulation product may optionally comprise a facer on one or both of its major surfaces. The facer may be any type of facing substrate known in the art such as, for example, a nonwoven mat, a foil mat, a polymeric surfacing mat, a woven textile, and the like.

The term "fibrous insulation product" is general and encompasses a variety of compositions, articles of manufacture, and manufacturing processes. The fibrous insulation products of the present disclosure comprise a plurality of randomly oriented fibers. In certain exemplary embodiments, the plurality of randomly oriented fibers are inorganic fibers, including, but not limited to glass fibers, glass wool fibers, mineral wool fibers, slag wool fibers, stone wool fibers, ceramic fibers, metal fibers, and combinations thereof.

Optionally, the fibers may include natural fibers and/or synthetic fibers such as carbon, polyester, polyethylene, polyethylene terephthalate, polypropylene, polyamide, aramid, and/or polyaramid fibers may be used in the nonwoven fiber mats. The term "natural fiber" as used herein refers to plant fibers extracted from any part of a plant, including, but not limited to, the stem, seeds, leaves, roots, or phloem. Examples of natural fibers suitable for use as the reinforcing fiber material include wood fibers, cellulosic fibers, straw, wood chips, wood strands, cotton, jute, bamboo, ramie, bagasse, hemp, coir, linen, kenaf, sisal, flax, henequen, and combinations thereof. The fibrous insulation products may be formed entirely of one type of fiber, or they may be formed of a combination of types of fibers. For example, the fibrous insulation products may be formed of combinations of various types of glass fibers or various combinations of different inorganic fibers and/or natural fibers depending on the desired application. In any of the embodiments disclosed herein, the insulation products are formed entirely of glass fibers.

Fibrous insulation is typically manufactured by fiberizing a molten composition of polymer, glass, or other mineral and spinning fibers from a fiberizing apparatus, such as a rotating spinner. To form an insulation product, fibers produced by the rotating spinner are drawn downwardly from the spinner towards a conveyor by a blower. As the fibers move downward, a binder composition is sprayed onto the fibers and the fibers are gathered and formed into a binder-infused fibrous pack on a forming conveyor within a forming chamber with the aid of a vacuum drawn through the fibrous pack from below the forming conveyor. The residual heat from the glass fibers and the flow of air through the fibrous pack during the forming operation are generally sufficient to volatilize a majority of the water from the binder before the glass fibers exit the forming chamber, thereby leaving the remaining components of the binder composition on the glass fibers as a viscous or semi-viscous high-solids liquid.

The binder-coated fibrous pack, which is in a compressed state due to the flow of air through the fibrous pack in the forming chamber, is then transferred out of the forming chamber to a transfer zone, where the fibrous pack vertically expands due to the resiliency of the glass fibers. The expanded fibrous pack is then heated, such as by conveying the fibrous pack through a curing oven where heated air is blown through the fibrous pack to evaporate any remaining water in the binder composition, cure the binder composition, and rigidly bond the glass fibers together.

Also, in the curing oven, the fibrous pack may be compressed by the upper and lower foraminous oven conveyors, to form the insulation layer of the fibrous insulation product. The upper and lower oven conveyors, may be used to compress the fibrous pack to give the insulation layer a predetermined thickness.

The cured binder composition imparts strength and resiliency to the insulation layer. It is to be appreciated that the drying and curing of the binder composition may be carried out in either one or two different steps. The two stage (two-step) process is commonly known as B-staging. The curing oven may be operated at a temperature from 100° C. to 325° C., or from 250° C. to 300° C. The fibrous pack 140 may remain within the curing oven for a period of time sufficient to crosslink (cure) the binder composition and form the insulation layer.

B-staging is a process wherein a binder-coated fibrous pack is heated to a tackifying temperature without crosslinking, such that the binder composition will stick together and adhere the fibers in the system to form a fibrous precursor. Thus, a B-staged fibrous precursor is an intermediate, yet curable product. Often B-staged products may be exposed to ambient temperatures for an extended period of time, which tends to cause traditional formaldehyde-free B-staged fibrous insulation precursors to dry-out and surface-harden, resulting in poor bond formation between the binder composition and the fibers when shaped into a desired end product. This causes a cured finished product to demonstrate poor tensile strength, due to the poor bonding between the fibers and the binder composition. However, it has been surprisingly discovered that the binder compositions formed in accordance with the present inventive concepts have improved shelf life and fiber wetting properties, even after extended exposure to prolonged ambient conditions.

Accordingly, in any of the embodiments disclosed herein, a B-staged fibrous insulation precursor has a drying time, as measured by a CEM Smart 6 moisture balance, of at least 500 seconds, such as at least 520 seconds, at least 540 seconds, at least 560 seconds, and at least 590 seconds. Due to the increased drying time, the B-staged fibrous insulation precursor can be B-staged for an extended period of time without the formation of a film, which is caused by binder drying.

Moreover, as mentioned above, the binder composition according to the present inventive concepts demonstrates a particularly beneficial viscosity for B-staging an uncured product. A binder composition with a low viscosity tends to migrate/flow along the fibers due to the pull of gravity. As a result, the bottom of a product will be more binder-rich (high LOI) than the top of the product, which will be binder depleted (low LOI). This in turn will result in a non-uniform product once the B-staged product is shaped and cured into a final, cured insulation product. To counteract the binder migration due to gravity, the subject binder compositions have an increased viscosity, which reduces the migration of binder solids during B-staging.

Fibrous insulation products may be characterized and categorized by many different properties, one of which is density. Density may range broadly from about 0.2 pounds/cubic foot ("pcf") to as high as about 10 pcf, depending on the product. Low or light density insulation batts and blankets typically have densities between about 0.2 pcf and about 5 pcf, more commonly from about 0.3 pcf to about 4 pcf, and have applications rates of about 2-13% LOI. Products such as residential insulation batts may fall in this group.

polyacrylic acid cross-linking agent and monomeric polyol in various weight ratios, although the ratio of molar equivalents of carboxylic acid groups to hydroxyl groups was kept constant at 0.87:1. A comparative binder composition (Comparative Example A) was prepared comprising both a monomeric polyol and a polymeric polyol (e.g., polyvinyl alcohol). A second comparative example (Comparative Example B) was prepared comprising polyacrylic acid and glycerol (three hydroxyl groups). The binder premixes were diluted with water and various additives were included, as set forth below in Table 4 to produce the final binder compositions.

TABLE 4

| (% By Weight of Total Solids) | Example A | Example B | Example C | Example D | Example E | Comp. Example A | Comp. Example B |
|---|---|---|---|---|---|---|---|
| Polyacrylic acid | 67.575 | 65.321 | 59.447 | 57.044 | 67.638 | 72.887 | 67.401 |
| Xylitol | 29.053 | — | — | — | — | — | — |
| PET | — | 31.413 | — | — | — | — | — |
| TMP | — | — | 31.413 | — | — | — | — |
| TEA | — | — | — | 40.081 | — | — | — |
| Sorbitol | — | — | — | — | 28.988 | 9.285 | — |
| PVOH | — | — | — | — | — | 13.928 | — |
| Glycerol | — | — | — | — | — | — | 29.236 |
| Sodium Hypophosphite | 2.703 | 2.613 | 2.378 | 2.282 | 2.706 | 3.250 | 2.706 |
| Surfactant (Dynol 607) | 0.500 | 0.500 | 0.500 | 0.500 | 0.500 | 0.500 | 0.500 |
| 3-Aminopropyltriethoxysilane | 0.186 | 0.186 | 0.186 | 0.186 | 0.186 | 0.186 | 0.186 |

Fibrous insulation products can be provided in other forms including board (a heated and compressed batt) and molding media (an alternative form of heated and compressed batt) for use in different applications. Fibrous insulation products also include higher density products having densities from about 10 pcf to about 20 pcf, (and often having binder LOI in excess of 12%) and medium density products more typically having a density from about 1 pcf to about 10 pcf, (and having binder LOI of about 5-15%) such as boards and panels. Medium and higher density insulation products may be used in industrial and/or commercial applications, including but not limited to metal building insulation, pipe or tank insulation, insulative ceiling and wall panels, duct boards and HVAC insulation, appliance and automotive insulation, etc.

Formed or shaped products may include a further step, optionally during cure, that compresses, molds or shapes the product to its specific final shape. Rigid boards are a type of shaped product, the shape being planar. Other shaped products may be formed by dies or molds or other forming apparatus. Rigidity may be imparted by the use of higher density of fibers and/or by higher levels of binder application. As an alternative to rotary fiberizing, some fibrous insulation products, particularly higher density, non-woven insulation products, may be manufactured by an air-laid or wet-laid process using premade fibers of glass, mineral wool, or polymers that are scattered into a random orientation and contacted with binder to form the product.

Having generally described this invention, a further understanding can be obtained by reference to certain specific examples illustrated below which are provided for purposes of illustration only and are not intended to be all inclusive or limiting unless otherwise specified.

EXAMPLE 1

Exemplary binder composition were prepared, as outlined below in Table 4. Each binder composition included a Fiberglass sheets were impregnated with each binder composition having an 8.0% by weight solids-based concentration. The LOI of the cured fiberglass sheets was about 26%. The binder impregnated fiberglass sheets were cured for 3.5 minutes at 400° F., and subsequently immersed into water for 3 hours in ambient conditions. The aqueous extract that leached from the impregnated sheets was dried and quantified as a percent of the cured binder in the binder impregnated fiberglass sheets. This binder extract analysis correlates the crosslink density for various polyols as it affects hot/humid performance and the amount of leachable extract, which affects moisture sensitivity, hot/humid performance, corrosivity of the binder and discoloration of the finished product in the event it is exposed to moisture.

As illustrated in FIG. 1, cured polyacrylic acid/sorbitol binder compositions comprising a ratio of molar equivalents of carboxylic acid groups to hydroxyl groups of 0.87:1 demonstrated a high crosslink density, resulting in the least amount of water solubles. Thus, fibrous insulation products made therewith will show reduced sensitivity towards moisture, due to this increased crosslink density. There will be smaller amounts of solids blooming onto the surface in case the product is exposed to moisture (water spill).

EXAMPLE 2

Fiberglass sheets impregnated with the binder compositions, Comparative Example B, Example A, Example C, Example D, and Example E, as outlined in Table 4, above, having a 30% dry solids concentration). The binder impregnated fiberglass sheets were dried using a CEM Smart 6 moisture analyzer, which is a commercially available instrument that uses a combination of infrared and microwave to rapidly analyze moisture and solids in any product. The particular test conditions are provided below:

| Test Conditions CEM Smart 6 | | |
| --- | --- | --- |
| Settings | Calculation Mode | Moisture/Solid |
| | Option | Standard |
| | Display Mode | Solids |
| | Ramp Time | 0:00 |
| | Delta Weight (mg) | 1 |
| | Delta Time | 15 |
| | Ambient Fan Speed | 50 |
| | Run Fan Speed | 50 |
| | Run Fan Off Time | 0:15 |
| Stages | 1 | |
| Parameters | Run Mode | Constant Weight |
| | MAG Power Percent | 0 |
| | IR Power Percent | 75 |
| | Run Time | 15:00 |
| | Max Temperature | 100 |
| Details | Minimum Sample Weight | 2.1 |
| | Maximum Sample Weight | 2.4 |
| | Mimimum Moisture Result | 0 |
| | Maximum Moisture Result | 100 |
| Equipment | CEM Smart 6 | |
| | CEM Square Sample Pads | |
| | CEM Sample Press | |

Testing Procedure:
1. Taring of 2 sample pads.
2. Placing of 1 sample pad onto Sample Press.
3. Evenly applying 2 ml of Binder solution (30% dry solids concentration) using Dosing Pipette) onto Sample Pad.
4. Covering Sample Pad with second Sample Pad-Binder is "sandwiched" between sample pads.
5. Pressing sample pads with the CEM Press to achieve even binder distribution.
6. Placing sample pads onto CEM Sample Holder.
7. Start Measurement.
8. Record Run Time of Drying Experiment upon completion of measurement (Read-out from Test Data provided by Test Instrument).

Figure 2:
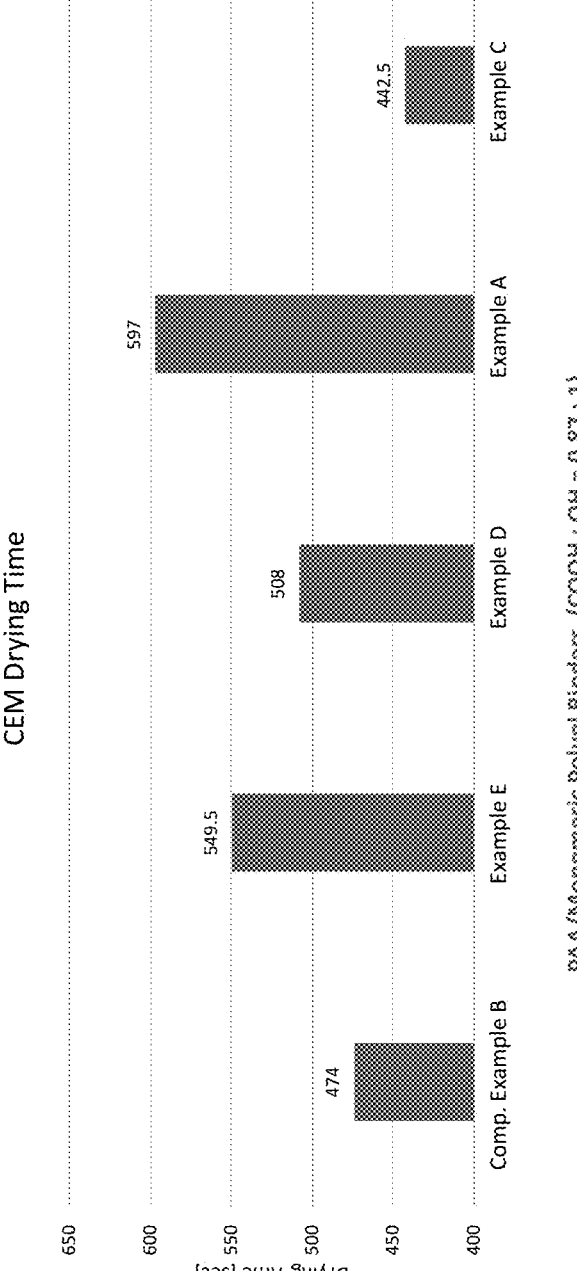
FIG. 2 graphically illustrates the drying time for various binder compositions, as measured by a CEM Smart 6 moisture balance.

FIG. 2 illustrates the CEM Smart 6 drying time for each binder-impregnated fiberglass sheet. As illustrated, the sheets formed using either Example E or Example A demonstrated the longest drying times, 549.5 seconds and 597 seconds, respectively, indicating longer B-staged shelf-life of uncured fiberglass products. A longer drying time also indicates a wider processing window for fiberglass insulation products in production (due to slower drying on the "ramp" and moisture retention throughout the uncured product prior to entering the curing oven), resulting in a more evenly cured product and improved product consistency. The slower drying time will assure that the uncured fiberglass on the ramp will stay moist and the uncured fiberglass product has an essentially uniform moisture distribution when it is cured. This provides more uniform properties in the finished product (e.g. bonding strength).

EXAMPLE 3

Example E and Comparative Examples A and B from Table 4, above, were utilized to form fiberglass rolls that were B-staged and had a 9% LOI. An additional comparative example was prepared using a phenol urea formaldehyde binder composition. The rolls were stored in different humidity conditions and weighted in periodic intervals. The dying behaviors of each binder-impregnated fiberglass rolls were observed in each condition.

Figure 3:
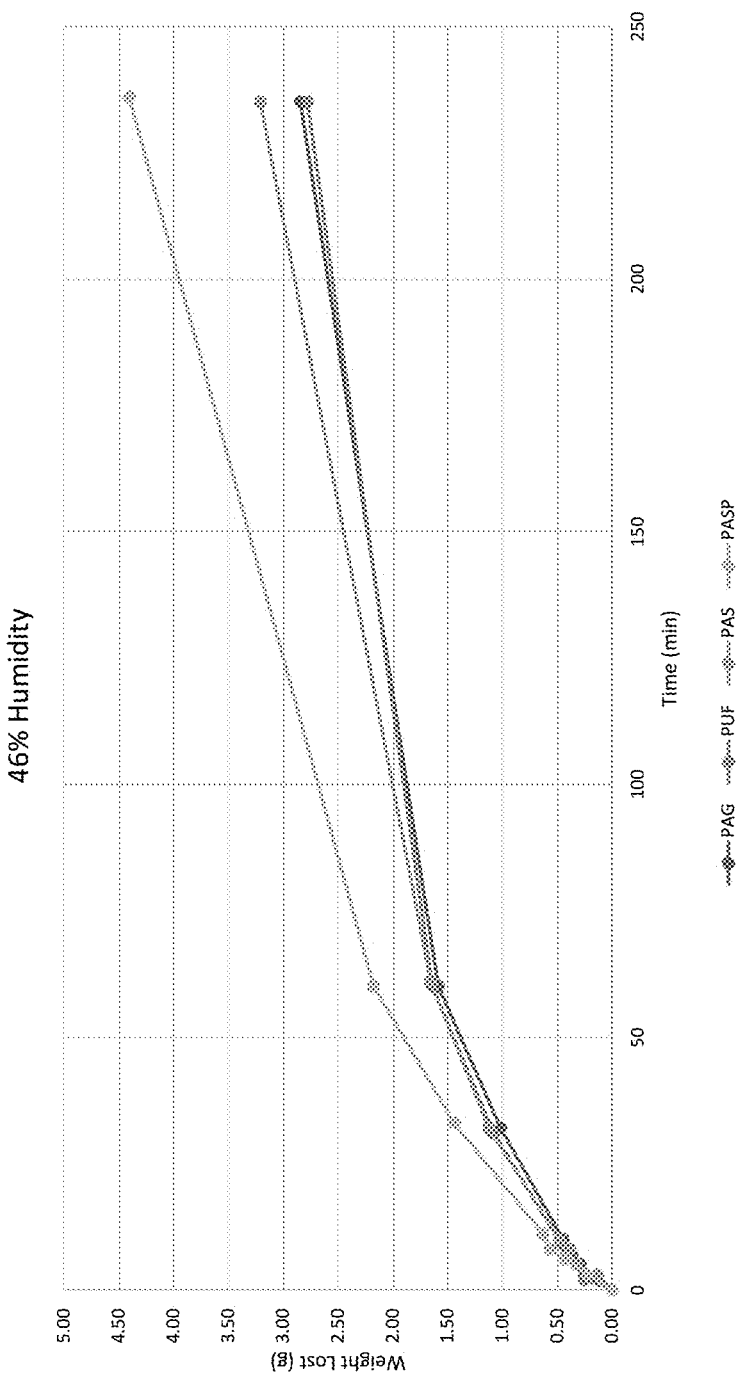
FIG. 3 graphically illustrates the measured weight loss (in grams) of fiberglass roll at periodic time intervals at 46% humidity at 25° C.

FIG. 3 illustrates the measured weight loss of each fiberglass roll at periodic time intervals at 46% humidity at 25° C. The fiberglass rolls were weighted initially and then after 2.5 minute, 5 minutes, 7.5 minutes, 10 minutes, 30 minutes, 60 minutes and 240 minutes. As illustrated, the sample formed with Example E demonstrated low levels of weight loss, similar to samples formed with traditional phenol urea formaldehyde binder compositions.

Figure 4:
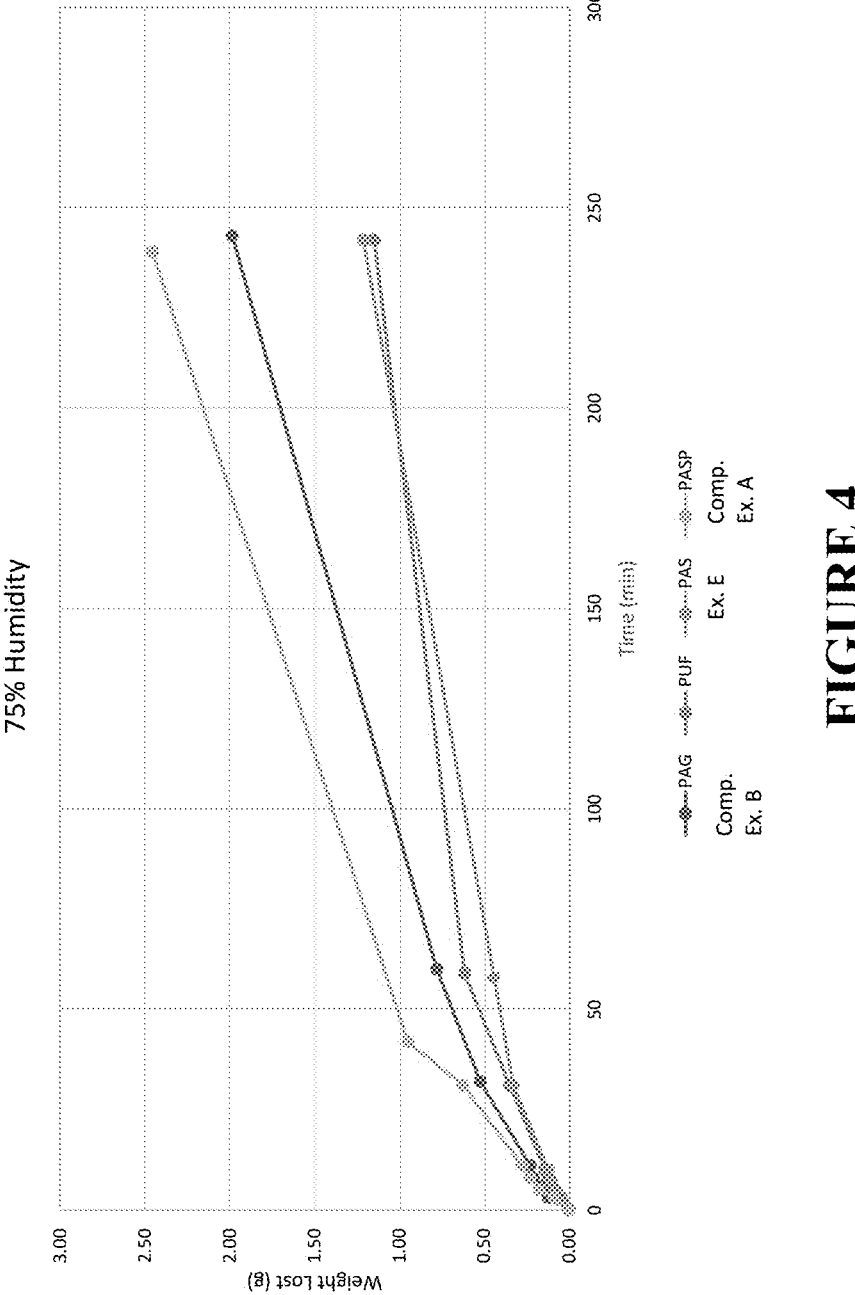
FIG. 4 graphically illustrates the measured weight loss (in grams) of binder-impregnated fiberglass rolls at periodic time intervals at 75% humidity at 25° C.

FIG. 4 similarly illustrates the measured weight loss of each fiberglass roll at periodic intervals, only this time at 75% humidity. The fiberglass rolls were again weighted initially and then after 2.5 minute, 5 minutes, 7.5 minutes, 10 minutes, 30 minutes, 60 minutes and 240 minutes. The results demonstrate that at high humidity levels, samples produced with Example E demonstrated the lowest weight loss of any formaldehyde-free binder composition tested, and has a similar weight loss profile as samples formed using a traditional phenol urea formaldehyde binder composition. In contrast, samples formed using the binder composition from Comparative Example A demonstrated the highest amount of weight loss, indicating that the binder composition dried more quickly than the others.

Figure 5:
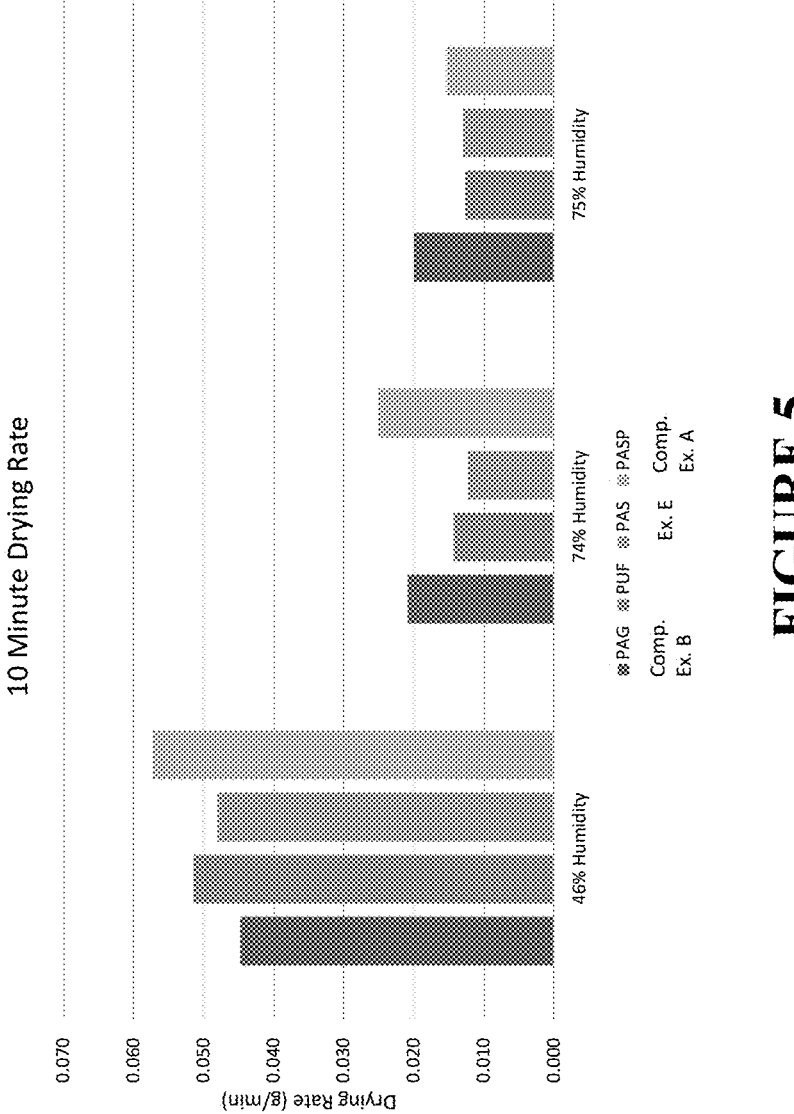
FIG. 5 illustrates the measured weight loss of binder-impregnated fiberglass rolls after 10 minutes at 46% humidity, 74% humidity, and 75% humidity and 25° C.

FIG. 5 illustrates the measured weight loss of each fiberglass roll after 10 minutes at 46% humidity, 74% humidity, and 75% humidity and 25° C. The results confirm that at high humidity levels (74% and 75%), samples produced with the binder composition of Example E demonstrated the lowest drying rate (0.012 g/min and 0.013 g/min, respectively) of any formaldehyde-free binder composition tested, and has a similar drying rate as samples formed using a traditional phenol urea formaldehyde binder composition. In contrast, samples formed using the binder composition of Comparative Example A, including a polymeric polyol, in addition to the monomeric polyol or Comparative Example B, including polyacrylic acid and glycerol, demonstrated the highest drying rate, indicating that the binder composition dried more quickly than the others.

It will be appreciated that many more detailed aspects of the illustrated products and processes are in large measure, known in the art, and these aspects have been omitted for purposes of concisely presenting the general inventive concepts. Although the present invention has been described with reference to particular means, materials and embodiments, from the foregoing description, one skilled in the art can easily ascertain the essential characteristics of the present disclosure and various changes and modifications can be made to adapt the various uses and characteristics without departing from the spirit and scope of the present invention as described above and set forth in the attached claims.

Paragraph 1. An aqueous binder composition comprising:
5.0% by weight to 50.0% by weight of a monomeric polyol having at least four hydroxyl groups, based on the total solids content of the aqueous binder composition; and
at least 50.0% by weight of a cross-linking agent comprising a polymeric polycarboxylic acid having at least two carboxylic acid groups, based on the total solids content of the aqueous binder composition, wherein a ratio of molar equivalents of carboxylic acid groups to hydroxyl groups is between 0.15/1 and 2.23/1, or between 0.60/1.0 and 1.0/0.6, and wherein the aqueous binder composition has a pH of 2.2 to 4.0 and a viscosity at 40% solids and 25° C. of 10 cP to 60 cP.

Paragraph 2. The aqueous binder composition of paragraph 1, wherein the cross-linking agent is polyacrylic acid.

Paragraph 3. The aqueous binder composition of any of paragraphs 1-2, wherein the cross-linking agent is present in the binder composition in an amount from 52.0% by weight to 72% by weight, based on the total solids content of the aqueous binder composition.

Paragraph 4. The aqueous binder composition of any of paragraphs 1-3, wherein the monomeric polyol comprises at least five hydroxyl groups.

Paragraph 5. The aqueous binder composition of any of paragraphs 1-4, wherein the ratio of molar equivalents of carboxylic acid groups to hydroxyl groups is between 0.26/1 and 0.75/1, or between 0.80/1.0 and 1.0/0.8

Paragraph 6. The aqueous binder composition of any of paragraphs 1-5, wherein the monomeric polyol comprises one or more of a sugar alcohols, pentaerythritol, primary alcohols, 1,2,4-butanetriol, trimethylolpropane, short-chain alkanolamines, and mixtures thereof.

Paragraph 7. The aqueous binder composition of any of paragraphs 1-6, wherein the monomeric polyol is selected from the group consisting of pentaerythritol, xylitol, sorbitol, and mixtures thereof.

Paragraph 8. The aqueous binder composition of any of paragraphs 1-7, wherein the monomeric polyol is present in the binder composition in an amount from 15% by weight to 37% by weight, based on the total solids content of the aqueous binder composition.

Paragraph 9. The aqueous binder composition of any of paragraphs 1-8, wherein the composition is free of polymeric polyhydroxy compounds.

Paragraph 10. The aqueous binder composition of any of paragraphs 1-9, wherein the composition is free of a monomeric carboxylic acid.

Paragraph 11. The aqueous binder composition of any of paragraphs 1-10, wherein the aqueous binder composition has a viscosity at 40% solids and 25° C. of 25 cP to less than 60 cP.

Paragraph 12. A fibrous insulation product comprising: a plurality of randomly oriented fibers; and a cross-linked formaldehyde-free binder composition at least partially coating the fibers, wherein the cross-linked formaldehyde-free binder composition contains less than 5.5% by weigh of water soluble material and is formed from an aqueous binder composition comprising:

5.0% by weight to 50.0% by weight of at least one monomeric polyol having at least four hydroxyl groups, based on the total solids content of the aqueous binder composition; and at least 50.0% by weight of a cross-linking agent comprising a polymeric polycarboxylic acid having at least two carboxylic acid groups, based on the total solids content of the aqueous binder composition, wherein said binder composition has an uncured pH of 2.2 to 4.0 and a ratio of molar equivalents of carboxylic acid groups to hydroxyl groups is between 0.15/1 and 2.23/1, or between 0.60/1.0 and 1.0/0.6.

Paragraph 13. The insulation product of paragraph 12, wherein the fibers comprise one or more of mineral fibers, natural fibers, and synthetic fibers.

Paragraph 14. The fibrous insulation product of any of paragraphs 12-13, wherein the fibers comprise glass fibers, mineral wool fibers, or a mixture thereof.

Paragraph 15. The fibrous insulation product of any of paragraphs 12-14, wherein the aqueous binder composition is free of polymeric polyhydroxy compounds.

Paragraph 16. The fibrous insulation product of any of paragraphs 12-15, wherein the ratio of molar equivalents of carboxylic acid groups to hydroxyl groups is between 0.26/1 and 0.75/1, or 0.80/1.0 and 1.0/0.8.

Paragraph 17. The fibrous insulation product of any of paragraphs 12-16, wherein the monomeric polyol comprises one or more of a sugar alcohols, pentaerythritol, primary alcohols, 1,2,4-butanetriol, trimethylolpropane, short-chain alkanolamines, and mixtures thereof.

Paragraph 18. The fibrous insulation product of any of paragraphs 12-17, wherein the fibrous insulation product comprises one or more of a ceiling board, duct board, foundation board, pipe and tank insulation, sound absorption board, acoustical panel, duct liner, residential insulation, duct wrap, metal building insulation, and flexible duct media.

Paragraph 19. The fibrous insulation product of any of paragraphs 12-18, wherein the insulation product includes a binder LOI of 5.5% to 17%.

Paragraph 20. A B-stageable fibrous insulation product comprising:

a plurality of randomly oriented fibers; and an uncured aqueous binder composition at least partially coating said fibers, the aqueous binder composition comprising:

5.0% by weight to 50.0% by weight of at least one monomeric polyol having at least four hydroxyl groups, based on the total solids content of the aqueous binder composition; and at least 50.0% by weight of a cross-linking agent comprising a polymeric polycarboxylic acid having at least two carboxylic acid groups, based on the total solids content of the aqueous binder composition, wherein the uncured aqueous binder composition has a viscosity at 40% solids and 25° C. of 10 cP to 60 cP, and wherein the B-stageable fibrous insulation product has a drying time, as measured by a CEM Smart 6 moisture analyzer, of at least 500 seconds.

Paragraph 21. The B-stageable fibrous insulation product of paragraph 20, wherein the uncured aqueous binder composition has a viscosity at 40% solids and 25° C. of 30 cP to 45 cP.

Paragraph 22. The B-stageable fibrous insulation product of any of paragraphs 20-21, wherein the cross-linking agent is polyacrylic acid.

Paragraph 23. The B-stageable fibrous insulation product of any of paragraphs 20-22, wherein the aqueous binder composition has a pH of 2.2 to 4.0.

Paragraph 24. The B-stageable fibrous insulation product of any of paragraphs 20-23, wherein the aqueous binder composition has a ratio of molar equivalents of carboxylic acid groups to hydroxyl groups is between 0.15/1 and 2.23/1, or between 0.60/1.0 and 1.0/0.6.

Paragraph 25. The B-stageable fibrous insulation product of any of paragraphs 20-24, wherein the monomeric polyol comprises one or more of a sugar alcohols, pentaerythritol, primary alcohols, 1,2,4-butanetriol, trimethylolpropane, short-chain alkanolamines, and mixtures thereof.

Paragraph 26. The B-stageable fibrous insulation product of any of paragraphs 20-25, wherein the composition is free of polymeric polyhydroxy compounds.

Paragraph 27. The B-stageable fibrous insulation product of any of paragraphs 20-26, wherein the composition is free of a monomeric carboxylic acid.

Paragraph 28. A method for producing a fibrous insulation product having a low level of water soluble material, comprising:

applying a formaldehyde-free aqueous binder composition to a plurality of fibers, the formaldehyde-free aqueous binder composition comprising:

5.0% by weight to 50.0% by weight of at least one monomeric polyol having at least four hydroxyl groups, based on the total solids content of the aqueous binder composition; and at least 50.0% by weight of a cross-linking agent comprising a polymeric polycarboxylic acid having at least two carboxylic acid groups, based on the total solids content of the aqueous binder composition, gathering the fibers onto a substrate, forming a binder-infused fibrous pack; and curing the binder-infused fibrous pack, wherein the fibrous insulation product contains less than 5.5% by weight of water soluble material.

Paragraph 29. The method for producing a fibrous insulation product of paragraph 28, wherein the formaldehyde-free aqueous binder composition comprises a ratio of molar equivalents of carboxylic acid groups to hydroxyl groups between 0.15/1 and 2.23/1, or between 0.60/1.0 and 1.0/0.6.

Paragraph 30. The method for producing a fibrous insulation product of any of paragraphs 28-29, wherein the formaldehyde-free aqueous binder composition has a pH of 2.2 to 4.0.

Paragraph 31. The method for producing a fibrous insulation product of any of paragraphs 28-30, wherein the formaldehyde-free aqueous binder composition has a viscosity at 40% solids and 25° C. of 10 cP to 60 cP.

Paragraph 32. A process for B-staging a fibrous insulation precursor, comprising:

applying a formaldehyde-free aqueous binder composition to a plurality of fibers, forming a binder-impregnated fibrous insulation precursor, said binder composition comprising:

5.0% by weight to 50.0% by weight of at least one monomeric polyol having at least four hydroxyl groups, based on the total solids content of the aqueous binder composition; and at least 50.0% by weight of a cross-linking agent comprising a polymeric polycarboxylic acid having at least two carboxylic acid groups, based on the total solids content of the aqueous binder composition;

exposing the binder-impregnated fibrous insulation precursor to ambient temperatures for at least 500 seconds, forming a B-staged fibrous precursor without the binder composition forming a film on a surface of the fibrous insulation precursor.

Paragraph 33. An aqueous formaldehyde-free binder composition comprising:

5.0% by weight to 50.0% by weight of at least one monomeric polyol having at least four hydroxyl groups;

55.0% by weight to 62% by weight of a polyacrylic acid crosslinking agent;

0.5% to 5.0% by weight a catalyst;

2.0% to, 15.0% by weight of a processing aid;

0 to 5.0% by weight of a surfactant;

0 to 2.0% by weight of a pigment; and 0 to 15% by weight of silicone, wherein the percentages are based on the total solids content of the aqueous binder composition; wherein a ratio of molar equivalents of carboxylic acid groups to hydroxyl groups is between 0.26/1 and 0.75/1, or 0.8/1 and 1/0.8, wherein the aqueous binder composition has a pH of 2.2 to 4.0 and a viscosity at 40% solids and 25° C. of 30 cP to 55 cP.

What is claimed is:

1. An aqueous binder composition comprising:

from 15% by weight to 37% by weight of a monomeric polyol having at least four-five hydroxyl groups, based on the total solids content of the aqueous binder composition; and at least 50.0% by weight of a cross-linking agent comprising a polymeric polycarboxylic acid having at least two carboxylic acid groups, based on the total solids content of the aqueous binder composition, wherein a ratio of molar equivalents of carboxylic acid groups to hydroxyl groups is between 0.32/1 and 0.92/1, wherein the aqueous binder composition has a pH of 2.2 to 4.0, wherein the monomeric polyol is selected from the group consisting of sugar alcohol, dimeric condensation product of a sugar alcohol, and oligomeric condensation product of a sugar alcohol, wherein the aqueous binder composition is free of polyvinyl alcohol, wherein the aqueous binder composition comprises 40% or less binder solids, and wherein after curing the aqueous binder composition at 400° F. for 3.5 minutes, the cured binder composition includes less than 3 wt. % of water-soluble material, as determined by extracting any water-soluble materials with deionized water for 3 hours at ambient condition using about 1000 g of deionized water per about 1 gram of the cured binder.

2. The aqueous binder composition of claim 1, wherein the cross-linking agent is polyacrylic acid.

3. The aqueous binder composition of claim 1, wherein the cross-linking agent is present in the aqueous binder composition in an amount from 52.0% by weight to 72% by weight, based on the total solids content of the aqueous binder composition.

4. The aqueous binder composition of claim 1, wherein the ratio of molar equivalents of carboxylic acid groups to hydroxyl groups is between 0.4/1 and 0.6/1.

5. The aqueous binder composition of claim 1, wherein the monomeric polyol is selected from the group consisting of xylitol, sorbitol, and mixtures thereof.

6. The aqueous binder composition of claim 1, wherein the composition is free of polymeric polyhydroxy compounds.

7. The aqueous binder composition of claim 1, wherein the composition is free of a monomeric carboxylic acid.

8. The aqueous binder composition of claim 2 further comprising:

2.0% to 15.0% by weight of a processing aid;

0 to 5.0% by weight of a surfactant;

0 to 2.0% by weight of a pigment; and 0 to 15% by weight of silicone, each percentage being based on a total solids content of the aqueous binder composition.

9. The aqueous binder composition of claim 1, wherein the monomeric polyol is sorbitol.

10. The aqueous binder composition of claim 1, wherein after cure, the cured binder composition includes no greater than 1 wt. % of water-soluble material.

11. A fibrous insulation product comprising:

a plurality of randomly oriented fibers; and a cross-linked formaldehyde-free binder composition at least partially coating the fibers, wherein the cross-linked formaldehyde-free binder composition is formed from the aqueous binder composition in accordance with claim 1.

12. The fibrous insulation product of claim 11, wherein the fibers comprise one or more of mineral fibers, natural fibers, and synthetic fibers.

13. The fibrous insulation product of claim 11, wherein the fibrous insulation product comprises one or more of a ceiling board, duct board, foundation board, pipe and tank insulation, sound absorption board, acoustical panel, duct liner, residential insulation, duct wrap, metal building insulation, and flexible duct media.

14. The fibrous insulation product of claim 11, wherein the fibrous insulation product includes a binder LOI of 5.5% to 17%.

15. A B-stageable fibrous insulation product comprising:
a plurality of randomly oriented fibers; and
the aqueous binder composition in accordance with claim 1 at least partially coating said fibers,
wherein the B-stageable fibrous insulation product has a drying time, as measured by a CEM Smart 6 moisture analyzer, of at least 500 seconds.

* * * * *